United States Patent
Wang et al.

(10) Patent No.: US 12,542,621 B2
(45) Date of Patent: Feb. 3, 2026

(54) INFORMATION PROCESSING METHOD AND COMMUNICATION APPARATUS FOR IMPROVING CHANNEL ENCODING BETWEEN DEVICES

(71) Applicant: HUAWEI TECHNOLOGIES CO., LTD., Guangdong (CN)

(72) Inventors: Xianbin Wang, Hangzhou (CN); Huazi Zhang, Hangzhou (CN); Jiajie Tong, Hangzhou (CN); Shengchen Dai, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/648,918

(22) Filed: Apr. 29, 2024

(65) Prior Publication Data

US 2024/0283562 A1    Aug. 22, 2024

Related U.S. Application Data

(63) Continuation of application No. PCT/CN2022/127779, filed on Oct. 26, 2022.

(30) Foreign Application Priority Data

Oct. 31, 2021    (CN) .......................... 202111278886.2

(51) Int. Cl.
   H04L 1/00    (2006.01)
   H03M 13/00   (2006.01)

(52) U.S. Cl.
   CPC .......... H04L 1/0009 (2013.01); H04L 1/0033 (2013.01); H04L 1/0057 (2013.01); *H03M 13/00* (2013.01)

(58) Field of Classification Search
   CPC ..... H04L 1/0045; H04L 1/0057; H04L 1/006; H04L 1/0058; H04L 1/0033;
   (Continued)

(56) References Cited

U.S. PATENT DOCUMENTS 8,627,189 B2 *   1/2014   Tan .................. H04L 1/0066
                                                714/795
8,630,362 B1 *   1/2014   von der Embse ...........
                                           H04L 27/26035
                                                375/261

(Continued)

OTHER PUBLICATIONS

Patrick Schulte et al, "Constant Composition Distribution Matching", arXiv:1503.05133v1 [cs.IT] Mar. 17, 2015, total 5 pages.

(Continued)

*Primary Examiner* — Justin R Knapp

(57) ABSTRACT

The technology of this application relates to an information processing method and a communication apparatus, to reduce implementation complexity of a distribution matcher, and improve encoding efficiency. The method includes obtaining information bits, where the information bits include K bits, and K is a positive integer. The method further includes mapping the information bits to a target symbol sequence based on a trellis diagram, where the target symbol sequence includes M symbols, M is a positive integer greater than K, the M symbols include m symbols whose values are first values, the trellis diagram includes at least M directed edges, and one directed edge corresponds to a value of one symbol in the target symbol sequence.

20 Claims, 9 Drawing Sheets

(58) Field of Classification Search
CPC .. H04L 1/0041; H04L 1/0009; H03M 13/256; Y02D 10/00
See application file for complete search history.

(56) References Cited

U.S. PATENT DOCUMENTS

| | | | |
|---|---|---|---|
| 9,749,028 B2* | 8/2017 | Suh | H04B 7/0619 |
| 10,848,249 B2 | 11/2020 | Morero et al. | |
| 11,483,076 B2* | 10/2022 | Bisplinghoff | H04L 27/3405 |
| 2019/0052509 A1 | 2/2019 | Krishnan et al. | |

OTHER PUBLICATIONS

Tsuyoshi Yoshida et al, "Hierarchical Distribution Matching for Probabilistically Shaped Coded Modulation", arXiv:1809.01653v2 [eess. SP] Dec. 26, 2018, total 11 pages.

Abdelkerim Amari et al:"Introducing Enumerative Sphere Shaping for Optical Communication Systems With Short Blocklengths", Journal of Lightwave Technology, vol. 37, No. 23, Dec. 1, 2019, total 11 pages.

Yunus Can Gültekin et al:"Enumerative Sphere Shaping for Wireless Communications with Short Packets", arXiv:1903.10244v2 [eess. SP] Nov. 12, 2019, total 14 pages.

* cited by examiner

INFORMATION PROCESSING METHOD AND COMMUNICATION APPARATUS FOR IMPROVING CHANNEL ENCODING BETWEEN DEVICES

CROSS-REFERENCE TO RELATED APPLICATIONS

This application is a continuation of International Application No. PCT/CN2022/127779, filed on Oct. 26, 2022, which claims priority to Chinese Patent Application No. 202111278886.2, filed on Oct. 31, 2021. The disclosures of the aforementioned applications are hereby incorporated by reference in their entireties.

TECHNICAL FIELD

Embodiments of the disclosure relate to the field of communication technologies, and in particular, to an information processing method and a communication apparatus.

BACKGROUND

A high-order modulation technology may map a plurality of codeword bits to a same modulation symbol. This manner can further improve spectral efficiency. For example, 16QAM maps four bits to one modulation symbol, and 64QAM maps six bits to one modulation symbol. In high-order modulation, different modulation symbols correspond to different energy. Transmitting more low-energy modulation symbols and less high-energy modulation symbols can save average energy. For a white Gaussian noise channel, when distribution of transmitted modulation symbols complies with Gaussian distribution, an amount of information transmitted per unit energy is the largest.

To make the transmitted modulation symbols comply with the Gaussian distribution, a shaping technology, such as geometric shaping and probabilistic shaping, is introduced to an encoding and modulation process. Implementation complexity of shaping processing affects feasibility of the solution.

SUMMARY

Embodiments of the disclosure provide an information processing method and a communication apparatus, to reduce implementation complexity of channel encoding and shaping processing, and improve channel encoding and transmission efficiency.

According to a first aspect, an embodiment of the disclosure provides an information processing method, including: obtaining information bits, where the information bits include K bits, and K is a positive integer; and mapping the information bits to a target symbol sequence based on a trellis diagram, where the target symbol sequence includes M symbols, M is a positive integer greater than K, the M symbols include m symbols whose values are first values, the trellis diagram includes at least M directed edges, and one directed edge corresponds to a value of one symbol in the target symbol sequence.

In the foregoing implementation, the value of the symbol is indicated based on the trellis diagram, and the information bits can be mapped to the target symbol sequence by reading the trellis diagram. This reduces operation complexity of shaping processing, and can improve channel encoding and transmission rates.

In a possible implementation, the mapping the information bits to a target symbol sequence based on a trellis diagram includes: sequentially determining M+1 element nodes in the trellis diagram based on the information bits, where a directed edge between two adjacent element nodes in the M+1 element nodes is used to determine the value of the symbol in the target symbol sequence, where a $1^{st}$ element node in the M+1 element nodes is related to a value of M and a value of m, a first element node is any one of first M element nodes in the M+1 element nodes, a next node of the first element node is a second element node in the M+1 element nodes, the first element node points to one or more element nodes in the trellis diagram, and the second element node is one of the one or more element nodes.

In the foregoing implementation, adjacent element nodes in the trellis diagram form directed edges, to form multi-level nesting. A plurality of element nodes are sequentially read based on parameter configuration of the target symbol sequence, so that the target symbol sequence can be quickly determined based on directed edges traversed by the plurality of element nodes.

According to a second aspect, an embodiment of the disclosure provides an information processing method, including: obtaining a target symbol sequence, where the target symbol sequence includes M symbols, M is a positive integer, and the M symbols include m symbols whose values are first values; and determining information bits based on a trellis diagram and the target symbol sequence, where the information bits include K bits, K is a positive integer, and K is less than M, the trellis diagram includes at least M directed edges, and one directed edge corresponds to a value of one symbol in the target symbol sequence.

In the foregoing implementation, the value of the symbol is indicated based on the trellis diagram, and the information bits can be recovered from the target symbol sequence by reading the trellis diagram. This can reduce operation complexity of de-shaping processing.

In a possible implementation, the determining information bits based on a trellis diagram and the target symbol sequence includes: updating a first bit sequence based on a value of at least one of M+1 element nodes in the trellis diagram, to obtain the information bits, where the first bit sequence includes K bits, and a value of each bit in the first bit sequence is a second value, where the value of the symbol in the target symbol sequence corresponds to a directed edge between two adjacent element nodes in the M+1 element nodes, a $1^{st}$ element node in the M+1 element nodes is related to a value of M and a value of m, a first element node is any one of first M element nodes in the M+1 element nodes, a next node of the first element node is a second element node in the M+1 element nodes, the first element node points to one or more element nodes in the trellis diagram, and the second element node is one of the one or more element nodes.

According to a third aspect, an embodiment of the disclosure provides a communication apparatus. The communication apparatus may be a transmitter, or may be an apparatus in a transmitter, or may be an apparatus that can be used in a matching manner with a transmitter. In an implementation, the communication apparatus may include modules that are in one-to-one correspondence with the method/operation/step/action described in the first aspect. The module may be a hardware circuit, software, or a combination of a hardware circuit and software. In an implementation, the communication apparatus may include a processing module and a communication module. For example, the communication module is configured to obtain information bits, where the information bits include K bits, and K is a positive integer.

The processing module is configured to map the information bits to a target symbol sequence based on a trellis diagram, where the target symbol sequence includes M symbols, M is a positive integer greater than K, the M symbols include m symbols whose values are first values, the trellis diagram includes at least M directed edges, and one directed edge corresponds to a value of one symbol in the target symbol sequence.

In a possible implementation, the processing module is specifically configured to sequentially determine M+1 element nodes in the trellis diagram based on the information bits, where a directed edge between two adjacent element nodes in the M+1 element nodes is used to determine the value of the symbol in the target symbol sequence, where a $1^{st}$ element node in the M+1 element nodes is related to a value of M and a value of m, a first element node is any one of first M element nodes in the M+1 element nodes, a next node of the first element node is a second element node in the M+1 element nodes, the first element node points to one or more element nodes in the trellis diagram, and the second element node is one of the one or more element nodes.

According to a fourth aspect, an embodiment of the disclosure provides a communication apparatus. The communication apparatus may be a receiver, or may be an apparatus in a receiver, or may be an apparatus that can be used in a matching manner with a receiver. In an implementation, the communication apparatus may include modules that are in one-to-one correspondence with the method/operation/step/action described in the first aspect. The module may be a hardware circuit, software, or a combination of a hardware circuit and software. In an implementation, the communication apparatus may include a processing module and a communication module. For example, the communication module is configured to obtain a target symbol sequence, where the target symbol sequence includes M symbols, M is a positive integer, and the M symbols include m symbols whose values are first values. The processing module is configured to determine information bits based on a trellis diagram and the target symbol sequence, where the information bits include K bits, K is a positive integer, and K is less than M, the trellis diagram includes at least M directed edges, and one directed edge corresponds to a value of one symbol in the target symbol sequence.

In a possible implementation, the processing module is specifically configured to update a first bit sequence based on a value of at least one of M+1 element nodes in the trellis diagram, to obtain the information bits, where the first bit sequence includes K bits, and a value of each bit in the first bit sequence is a second value, where the value of the symbol in the target symbol sequence corresponds to a directed edge between two adjacent element nodes in the M+1 element nodes, a $1^{st}$ element node in the M+1 element nodes is related to a value of M and a value of m, a first element node is any one of first M element nodes in the M+1 element nodes, a next node of the first element node is a second element node in the M+1 element nodes, the first element node points to one or more element nodes in the trellis diagram, and the second element node is one of the one or more element nodes.

In a possible implementation of any one of the first aspect to the fourth aspect, when the first element node points to a plurality of element nodes, values of symbols corresponding to directed edges between the first element node and the different element nodes to which the first element node points are different.

In a possible implementation of any one of the first aspect to the fourth aspect, each element node in the trellis diagram has a value, and when the first element node points to the plurality of element nodes, a value of the first element node is less than or equal to a sum of values of the plurality of element nodes to which the first element node points.

In a possible implementation of any one of the first aspect to the fourth aspect, the trellis diagram includes at least M+1 element nodes, a third element node is any one of the at least M+1 element nodes, the third element node indicates a combinatorial number $C_I^i$, a value of the third element node is less than or equal to the combinatorial number $C_I^i$, $0 \le i \le I$, $0 \le I \le N$, $N \ge M$, i, I, and N are all integers, and different element nodes in the trellis diagram indicate different combinatorial numbers.

In the foregoing implementation, the value of each element node in the trellis diagram indicates a combinatorial number of a value type of a currently remaining symbol. The trellis diagram may determine the target symbol sequence and a symbol sequence whose length is longer than that of the target symbol sequence. When the target symbol sequence is determined by reading the trellis diagram, traversal may not start from an element node that indicates a largest combinatorial number, so that application of the trellis diagram is more flexible.

In a possible implementation of any one of the first aspect to the fourth aspect, if an effective number of bits in a binary number corresponding to the combinatorial number $C_I^i$ is greater than a target effective number of bits, the value of the third element node is less than the combinatorial number $C_I^i$, and an effective number of bits in a binary number corresponding to the value of the third element node is the target effective number of bits; or if an effective number of bits in a binary number corresponding to the combinatorial number $C_I^i$ is less than or equal to a target effective number of bits, the value of the third element node is equal to the combinatorial number $C_I^i$.

In the foregoing implementation, the target effective number of bits is introduced, to reduce an effective number of bits in each element node in the trellis diagram. This can compress storage space occupied by the trellis diagram.

In a possible implementation of any one of the first aspect to the fourth aspect, when a value of I is an even number, $$0 \le i \le \frac{I}{2} \text{ or } \frac{I}{2} \le i \le I;$$

or when a value of I is an odd number $$0 \le i \le \frac{I-1}{2} \text{ or } \frac{I-1}{2} < i \le I.$$

In this implementation, based on symmetry of combinatorial numbers, one of two element nodes whose indicated combinatorial numbers are symmetrical is reserved in the trellis diagram, so that storage compression of the trellis diagram can be implemented, thereby avoiding unnecessary resource waste.

According to a fifth aspect, an embodiment of the disclosure provides a communication apparatus. The communication apparatus includes a processor, configured to implement the method described in the first aspect. The communication apparatus may further include a memory, configured to store instructions and data. The memory is coupled to the processor. When executing the instructions stored in the memory, the processor can implement the method described in the first aspect. The communication apparatus may further include a communication interface. The communication interface is used by the apparatus to communicate with another device. For example, the communication interface may be a transceiver, a circuit, a bus, a module, or another type of communication interface.

In a possible implementation, the communication apparatus includes: the memory, configured to store program instructions; and the processor, configured to obtain information bits through the communication interface, where the information bits include K bits, and K is a positive integer. The processor is further configured to map the information bits to a target symbol sequence based on a trellis diagram, where the target symbol sequence includes M symbols, M is a positive integer greater than K, the M symbols include m symbols whose values are first values, the trellis diagram includes at least M directed edges, and one directed edge corresponds to a value of one symbol in the target symbol sequence.

According to a sixth aspect, an embodiment of the disclosure provides a communication apparatus. The communication apparatus includes a processor, configured to implement the method described in the second aspect. The communication apparatus may further include a memory, configured to store instructions and data. The memory is coupled to the processor. When executing the instructions stored in the memory, the processor can implement the method described in the second aspect. The communication apparatus may further include a communication interface. The communication interface is used by the apparatus to communicate with another device. For example, the communication interface may be a transceiver, a circuit, a bus, a module, or another type of communication interface.

In a possible implementation, the communication apparatus includes: the memory, configured to store program instructions; and the processor, configured to obtain a target symbol sequence through the communication interface, where the target symbol sequence includes M symbols, M is a positive integer, and the M symbols include m symbols whose values are first values. The processor is further configured to determine information bits based on a trellis diagram and the target symbol sequence, where the information bits include K bits, K is a positive integer, and K is less than M, the trellis diagram includes at least M directed edges, and one directed edge corresponds to a value of one symbol in the target symbol sequence.

According to a seventh aspect, an embodiment of the disclosure provides a communication system, including the communication apparatus described in the third aspect or the fifth aspect and the communication apparatus described in the fourth aspect or the sixth aspect.

According to an eighth aspect, an embodiment of the disclosure further provides a computer program. When the computer program is run on a computer, the computer is enabled to perform the method provided in the first aspect or the second aspect.

According to a ninth aspect, an embodiment of the disclosure further provides a computer program product, including instructions. When the instructions are run on a computer, the computer is enabled to perform the method provided in the first aspect or the second aspect.

According to a tenth aspect, an embodiment of the disclosure further provides a computer-readable storage medium, where the computer-readable storage medium stores a computer program or instructions, and when the computer program or the instructions are run on a computer, the computer is enabled to perform the method provided in the first aspect or the second aspect.

According to an eleventh aspect, an embodiment of the disclosure further provides a chip. The chip is configured to read a computer program stored in a memory, to perform the method provided in the first aspect or the second aspect.

According to a twelfth aspect, an embodiment of the disclosure further provides a chip system. The chip system includes a processor, configured to support a computer apparatus in implementing the method provided in the first aspect or the second aspect. In a possible implementation, the chip system further includes a memory, and the memory is configured to store a program and data that are necessary for the computer apparatus. The chip system may include a chip, or may include a chip and another discrete component.

For beneficial effects that can be achieved in any one of the second aspect to the twelfth aspect, specifically refer to descriptions of beneficial effects that can be achieved in any possible implementation of the first aspect.

DESCRIPTION OF EMBODIMENTS

The following describes in detail embodiments of the disclosure with reference to the accompanying drawings.

Embodiments of the disclosure may be applied to various wireless communication systems. For example, the foregoing wireless communication system may include, but is not limited to, a $5^{th}$ generation (5G) communication system, a future communication system (such as a 6G communication system), a satellite communication system, a device-to-device (D2D) communication system, a machine-to-machine (M2M) communication system, an internet of things (IoT) system, a drone communication system, a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three application scenarios of a 5G mobile communication system: eMBB, ultra-reliable low-latency communication (URLLC), and massive machine-type communications (mMTC).

A communication device in a communication system may transmit a signal to another communication device, or receive a signal from another device. A communication device that transmits a signal may be referred to as a transmitter, and a communication device that receives a signal may be referred to as a receiver. The signal may include one or more of information, configuration information, or data. The communication device may also be referred to as a device, an entity, a network entity, a communication module, a node, a communication node, or the like. In the embodiment of the disclosure, the device is used as an example for description. Specifically, the communication system may include at least one terminal device and at least one access network device. The terminal device may be used as the transmitter, and the access network device may be used as the receiver; one terminal device may be used as the transmitter, and another terminal device may be used as the receiver; the access network device may be used as the transmitter, and the terminal device may be used as the receiver; or one access network device may be used as the transmitter, and another access network device may be used as the receiver. In other words, it may be understood that the terminal device and the access network device may transmit signals to each other. If the communication system includes a plurality of terminal devices, the plurality of terminal devices may also transmit signals to each other.

Figure 1:
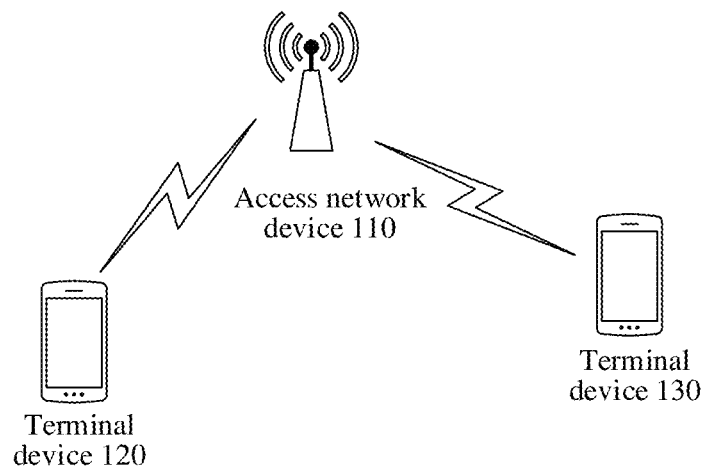
FIG. 1 is a schematic diagram of an architecture of a communication system according to an example embodiment of the disclosure.

For example, FIG. 1 shows a communication system. The communication system includes an access network device 110 and two terminal devices, namely, a terminal device 120 and a terminal device 130. At least one of the terminal device 120 and the terminal device 130 may transmit a signal to the access network device 110, and the access network device 110 may receive the signal. Alternatively, the access network device may transmit a signal to at least one of the terminal device 120 and the terminal device 130.

The following describes in detail the terminal device and the access network device in the communication system.

The access network device may be a base station (BS), and the access network device may also be referred to as a network device, an access node (AN), or a radio access node (RAN). The access network device may be connected to a core network (for example, an LTE core network or a 5G core network), and the access network device may provide a radio access service for the terminal device. For example, the access network device includes but is not limited to at least one of the following: a base station, a next generation NodeB (gNB) in 5G, an access network device in an open radio access network (O-RAN), an evolved NodeB (eNB), a radio network controller (RNC), a NodeB (NB), a base station controller (BSC), a base transceiver station (BTS), a home base station (for example, a home evolved nodeB or a home node B, HNB), a baseband unit (BBU), a transmission reception point (TRP), a transmission point (TP), a mobile switching center, and/or the like. Alternatively, the access network device may be a central unit (CU), a distributed unit (DU), a central unit control plane (CU-CP) node, or a central unit user plane (CU-UP) node. Alternatively, the access network device may be a relay station, an access point, a vehicle-mounted device, a wearable device, an access network device in a future evolved public land mobile network (PLMN), or the like.

For example, the wireless communication system usually includes cells. Each cell includes a base station (BS), and the base station provides communication services for a plurality of mobile stations (MSs). The base station includes a BBU and a remote radio unit (RRU). The BBU and the RRU may be placed in same or different places. For example, the RRU is remotely placed in a heavy-traffic area, and the BBU is placed in a central equipment room. Alternatively, the BBU and the RRU may be placed in a same equipment room. Alternatively, the BBU and the RRU may be different components in a same rack.

In the embodiments of the disclosure, a communication apparatus configured to implement a function of the access network device may be an access network device, or may be a network device that has some functions of the access network device, or may be an apparatus that can support the access network device in implementing the function, the apparatus is, for example, a chip system, a hardware circuit, a software module, or a combination of a hardware circuit and a software module. The apparatus may be installed in an access network device. In the method in embodiments of the disclosure, an example in which the communication apparatus configured to implement the function of an access network device is an access network device is used for description.

The terminal device is also referred to as a terminal, user equipment (UE), a mobile station (MS), a mobile terminal (MT), or the like, and is a device that provides a user with voice and/or data connectivity. The terminal device may communicate with one or more core networks via an access network device. The terminal device includes a handheld device that has a wireless connection function, another processing device connected to a wireless modem, a vehicle-mounted device, or the like. The terminal device may be a portable, pocket-sized, handheld, computer built-in, or vehicle-mounted mobile apparatus. Some examples of the terminal device are: a personal communication service (PCS) phone, a cordless phone, a session initiation protocol (SIP) station set, a wireless local loop (WLL) station, a personal digital assistant (PDA), a wireless network camera, a mobile phone, a tablet computer, a notebook computer, a palmtop computer, a mobile internet device (MID), a wearable device such as a smart watch, a virtual reality (VR)

device, an augmented reality (AR) device, a wireless terminal in industrial control, a terminal in an internet of vehicles system, a wireless terminal in self driving, a wireless terminal in a smart grid, a wireless terminal in transportation safety, a wireless terminal in a smart city, such as a smart oil filler, a terminal device on a high-speed train, and a wireless terminal in a smart home, such as a smart speaker, a smart coffee machine, and a smart printer.

In embodiments of the disclosure, a communication apparatus configured to implement a function of the terminal device may be a terminal device, or may be a terminal device that has some functions of a terminal, or may be an apparatus that can support the terminal device in implementing the function, the apparatus may be, for example, a chip system. The apparatus may be installed in the terminal device. In the embodiment of the disclosure, the chip system may include a chip, or may include a chip and another discrete component. In the technical solutions provided in embodiments of the disclosure, an example in which the communication apparatus configured to implement the function of the terminal device is a terminal device (UE) is used for description.

"At least one" in embodiments of the disclosure indicates "one or more". "A plurality of" means two or more than two. The term "and/or" describes an association relationship for describing associated objects and represents that at least three relationships may exist. For example, A and/or B may represent the following three cases: Only A exists, both A and B exist, and only B exists. The character "/" generally indicates an "or" relationship between the associated objects. In addition, it should be understood that although terms such as "first" and "second" may be used in embodiments of the disclosure to describe objects, these objects should not be limited by these terms. These terms are merely used to distinguish the objects from each other.

Terms "including", "having", and any other variant thereof mentioned in descriptions of embodiments of the disclosure are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device. It should be noted that, in embodiments of the disclosure, the term "example", "for example", or the like represents giving an example, an illustration, or a description. Any method or implementation scheme described as an "example" or "for example" in embodiments of the disclosure should not be explained as being more preferred or having more advantages than another method or implementation scheme. Exactly, use of the term "example", "for example", or the like is intended to present a related concept in a specific manner.

Figure 2:
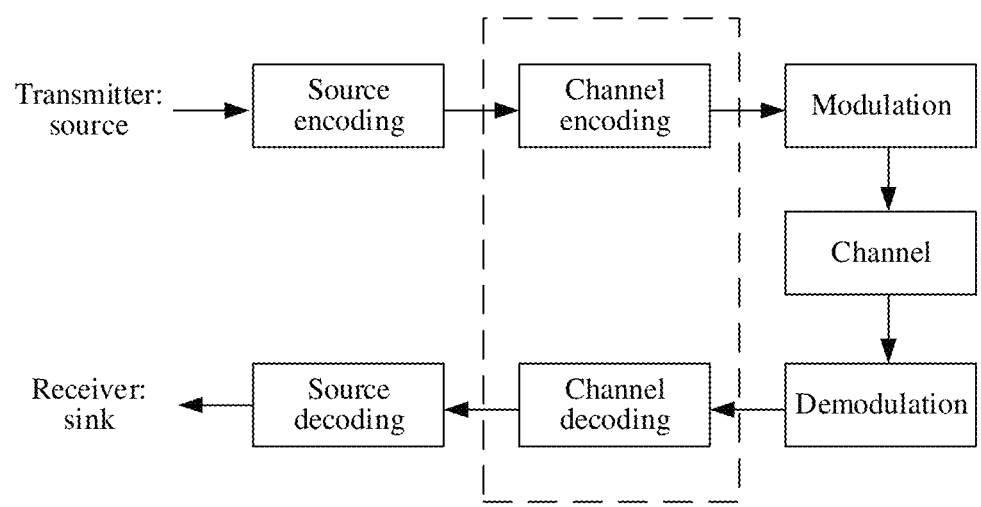
FIG. 2 is a schematic flowchart of an example channel encoding and transmission scheme.

Embodiments of the disclosure relate to channel encoding in the wireless communication system. In the wireless communication system, channel encoding is usually used to improve data transmission performance. As shown in FIG. 2, a signal source at a transmitter is transmitted through a channel sequentially through source encoding, channel encoding, and modulation. After receiving a signal, a receiver sequentially performs demodulation, channel decoding, and source decoding, to obtain an original information bits.

Encoding based on a polar code is a commonly used channel encoding manner. A shaping technology is introduced to polar encoding, so that a transmitted modulation symbol complies with Gaussian distribution, and an amount of information transmitted per unit energy is the largest. The shaping technology includes geometric shaping, probabilistic shaping, and the like. A characteristic of the geometric shaping is: Equal-probabilistic distribution of input symbols is maintained, but constellation points are specially designed, low-energy constellation points are densely distributed, and high-energy constellation points are sparsely distributed. A characteristic of the probabilistic shaping is: Constellation distribution maintains unchanged, a probability of a constellation point is adjusted, a low-energy symbol has a high probability, and a high-energy symbol has a low probability.

Figure 3A:
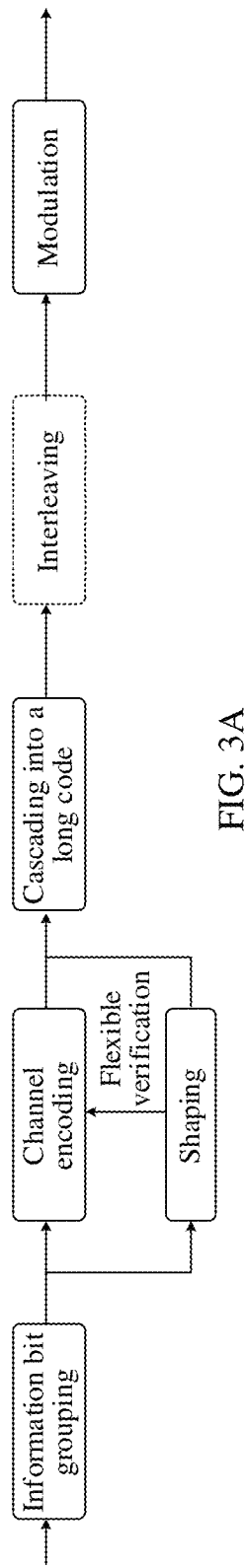
FIG. 3A is one of schematic flowcharts of example polar shaping and encoding.

The polar encoding to which the shaping technology is introduced may also be understood as a polar shaping and encoding operation. Specifically, refer to FIG. 3A and FIG. 3B to understand the polar shaping and encoding operation. Information bit grouping in FIG. 3A is specifically represented in FIG. 3B as follows: A transmitter may divide an information bit sequence with a length of K' into three groups, which are denoted as $U_1=u_1, u_2, \ldots u_{k_1}$, $U_2=u_{k_1+1}, u_{k_1+2}, \ldots u_{k_2}$, and $U_3=u_{k_2+1}, u_{k_2+2}, \ldots u_{K'}$. Shaping and channel encoding in FIG. 3A are specifically represented in FIG. 3B as follows: The sequence $U_3$ is mapped via a distribution matcher DM, to obtain $S'_3=S'_{3,1}, \ldots, S'_{3,N}$. N is a length of a symbol sequence. Polar transform is performed on $S'_3$ to obtain $m_{3,1}, \ldots, m_{3,N}$. Polar channel encoding is performed on sequences $M_{3,F} \{m_{3,i}, i \in F\}$, $U_1$, and $U_2$, to obtain $C'_1=c'_{1,1}, \ldots, c'_{1,N}$, and $C'_2=c'_{2,1}, \ldots, c'_{2,N}$. Cascading into a long code in FIG. 3A is specifically represented in FIG. 3B as follows: $C'_1$, $C'_2$ and $S'_3$ are cascaded into a long code, to obtain $C_1$, $C_2$ and $S_3$. Polar transform is performed on $c'_{1,i}$, $c'_{2,i}$, and $s'_{3,i}$, to obtain $c_{1,i}$, $c_{2,i}$, and $s_{3,i}$. Polar transform that is not with a length of a mother code may be shortened and performed back to front in a natural (NAT) order, that is, last several bits are set to 0. Interleaving in FIG. 3A is specifically represented in FIG. 3B as follows: Intra-block interleaving is separately performed on $C'_1$, $C'_2$ and $S'_3$, to obtain $C_1$, $C_2$ and $S_3$. Modulation in FIG. 3A is specifically represented in FIG. 3B as follows: $C_1$, $C_2$, and $S_3$ are mapped to an 8-amplitude shift keying (ASK) modulation symbol, which is denoted as X. $c_{1,i}$, $c_{2,i}$, and $s_{3,i}$ are mapped to xi. A symbol obtained through modulation complies with Gaussian-like distribution, so that probability shaping effect can be achieved, to improve spectral efficiency.

In the foregoing shaping and channel encoding processes, the distribution matcher DM is mainly responsible for mapping, based on an algorithm of the DM, an evenly distributed binary bit sequence to a symbol sequence that complies with specific distribution. The following further describes in detail implementation of the algorithm of the DM in a related technology.

In the related technology, An DM is specifically a constant composition distribution matcher (CCDM). The CCDM usually sets the symbol sequence that complies with the specific distribution, for example, denotes the symbol sequence as a target sequence, and determines, based on a possible quantity of target sequences, a quantity of information bits, that is, bits on which shaping needs to be performed, that can be carried in the target sequence. Further, the CCDM may map, in an arithmetic encoding manner, the information bits that can be carried to a symbol sequence that complies with a specific distribution. For example, it is assumed that the target sequence is a sequence that is with a length of 4 bits and that includes two bits that are 0 and two bits that are 1 There may be six such sequences, and the quantity of information bits that can be carried in the target sequence are $\lfloor \log 2(6) \rfloor = 2$. In other words, the CCDM may map information bits (which are also referred to as an information bit sequence) such as 00/01/10/11 to the target sequence through arithmetic encoding. Specifically, the arithmetic encoding process may be understood with reference to the following steps.

Step 1: There may be six cases when the target sequences are arranged and grouped. It is considered that a line segment with a length of 1 is equally divided into six sub-line segments, which respectively correspond to six specific sequences: 0011/0101/0110/1001/1010/1100. The division process is denoted as B, and is used to implement correspondence between the sub-line segments and the target sequences. Specifically, the division B may be understood through a process of taking one ball from a bag each time and not putting it back.

It is assumed that there are two types of balls in the bag: two balls that are 0 and two balls that are 1.

Figure 4A:
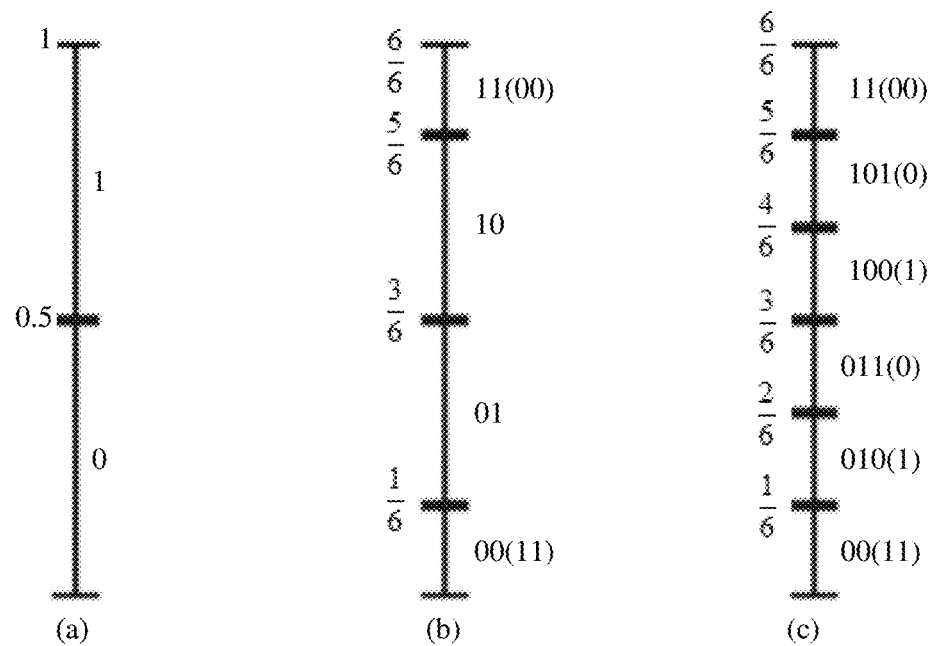
FIG. 4A is one of schematic diagrams of example sequence mapping based on arithmetic encoding.

First, after a $1^{st}$ ball is taken out of the bag, if the $1^{st}$ ball is 0, there are still two balls that are 1 and one ball that is 0 in the bag. There are three cases based on different arrangement. If the $1^{st}$ ball taken out of the bag is 1, there are two balls that are 0 and one ball that is 1 in the bag. There are also three cases based on different arrangement. Based on this, a line segment 1 may be divided into two sub-line segments as shown in (a) in FIG. 4A. A sub-line segment [0.5, 1] in an upper half corresponds to a target sequence in which a $1^{st}$ bit is 1, and a sub-line segment [0, 0.5] in a lower half corresponds to a target sequence in which a $1^{st}$ bit is 0.

If the $1^{st}$ ball taken out is 0, a $2^{nd}$ ball is taken. If the $2^{nd}$ ball is 0, remaining two balls in the bag are both 1, that is, there is only one case. If the $2^{nd}$ ball is 1, remaining balls in the bag are one ball that is 0 and one ball that is 1, that is, there are two cases. Therefore, the sub-line segment that is in the lower half and that is previously determined may be divided into two parts at a ratio of 2:1, where a ratio of a length of a sub-line segment corresponding to the $2^{nd}$ ball that is 1 to a length of a sub-line segment corresponding to the $2^{nd}$ ball that is 0 is 2:1. Alternatively, if the $1^{st}$ ball taken out is 1, a $2^{nd}$ ball is taken. If the $2^{nd}$ ball is 1, remaining two balls in the bag are both 0, that is, there is only one case. If the $2^{nd}$ ball is 0, remaining balls in the bag are one ball that is 0 and one ball that is 1, that is, there are two cases. Therefore, the sub-line segment that is in the upper half and that is previously determined may be divided into two parts at a ratio of 2:1, where a ratio of a length of a sub-line segment corresponding to the $2^{nd}$ ball that is 0 to a length of a sub-line segment corresponding to the $2^{nd}$ ball that is 1 is 2:1. Based on this, refer to an indication of (b) in FIG. 4A. A sub-line segment $$\left[0, \frac{1}{6}\right]$$

corresponds to a target sequence in which a $1^{st}$ bit is 0 and a $2^{nd}$ bit is 0, a sub-line segment $$\left[\frac{1}{6}, \frac{3}{6}\right]$$

corresponds to a target sequence in which a $1^{st}$ bit is 0 and a $2^{nd}$ bit is 1, a sub-line segment $$\left[\frac{3}{6}, \frac{5}{6}\right]$$

corresponds to a target sequence in which a $1^{st}$ bit is 1 and a $2^{nd}$ bit is 0, and a sub-line segment $$\left[\frac{5}{6}, \frac{6}{6}\right]$$

corresponds to a target sequence in which a $1^{st}$ bit is 1 and a $2^{nd}$ bit is 1.

The foregoing process is repeated, and so on, until the line segment 1 is equally divided. Refer to an indication of (c) in FIG. 4A. A sub-line segment $$\left[0, \frac{1}{6}\right]$$

corresponds to a target sequence 0011, a sub-line segment $$\left[\frac{1}{6}, \frac{2}{6}\right]$$

corresponds to a target sequence 0101, a sub-line segment $$\left[\frac{2}{6}, \frac{3}{6}\right]$$

corresponds to a target sequence 0110, a sub-line segment $$\left[\frac{3}{6}, \frac{4}{6}\right]$$

corresponds to a target sequence 1001, a sub-line segment $$\left[\frac{4}{6}, \frac{5}{6}\right]$$

corresponds to a target sequence 1010, and a sub-line segment $$\left[\frac{5}{6}, \frac{6}{6}\right]$$

corresponds to a target sequence 1100.

Step 2: Similarly, there may be four cases when the information bits are arranged and grouped. It is considered that a line segment with a length of 1 is equally divided into four sub-line segments, which respectively correspond to four specific sequences 00/01/10/11. The division process is denoted as A, and is used to implement correspondence between the sub-line segments and the information bit sequences. For a division manner of A, refer to the division manner of B in step 1. The line segment with the length of 1 is divided into four equal segments, a sub-line segment $$\left[0, \frac{1}{4}\right]$$

corresponds to an information bit sequence 00, a sub-line segment $$\left[\frac{1}{4}, \frac{2}{4}\right]$$

corresponds to an information bit sequence 01, a sub-line segment $$\left[\frac{2}{4}, \frac{3}{4}\right]$$

corresponds to an information bit sequence 10, and a sub-line segment $$\left[\frac{3}{4}, \frac{4}{4}\right]$$

corresponds to an information bit sequence 11.

Figure 4B:
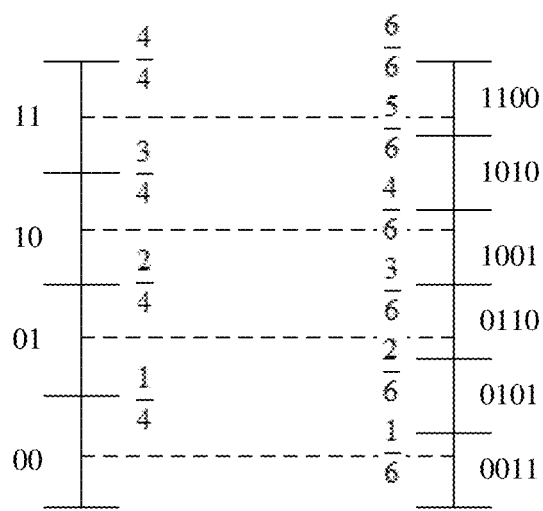
FIG. 4B is one of schematic diagrams of example sequence mapping based on arithmetic encoding.

Further, refer to FIG. 4B. For correspondence between the four information bit sequences and the six target information bit sequences, one information bit sequence and a target sequence corresponding to the information bit sequence satisfy the following condition: A midpoint value of a sub-line segment corresponding to the information bit sequence in A belongs to a range of a sub-line segment corresponding to the target sequence in B. For example, the information bit sequence 00 corresponds to the target sequence 0011, and the bit sequence 01 corresponds to the target sequence 0110.

Figure 5:
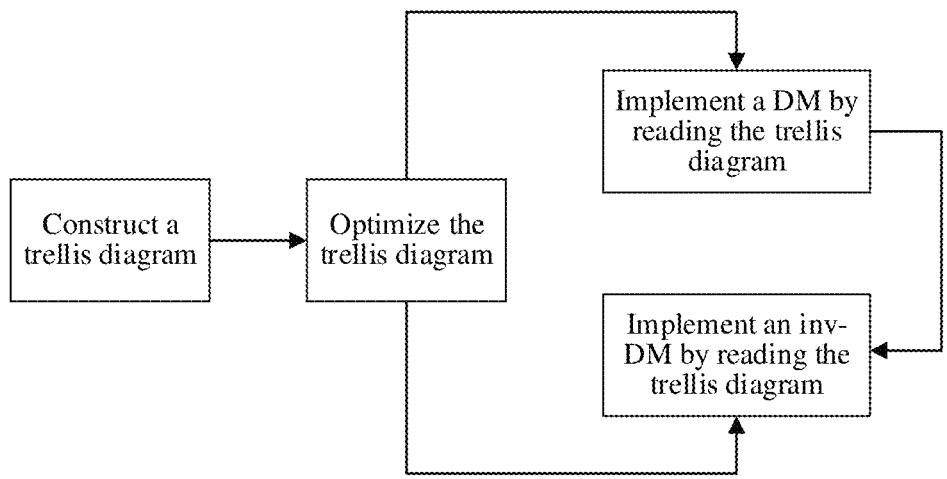
FIG. 5 is a schematic diagram of implementation of a DM based on a trellis diagram according to an example embodiment of the disclosure.

It can be learned from the foregoing that, implementation of the DM based on the arithmetic encoding relates to much line segment segmentation, and a division operation, that is, averaging, is needed for segmentation in each step. Such a design is complex, a delay is easily increased, and communication performance of channel encoding is affected. Therefore, embodiments of the disclosure provide an information processing method, to implement mapping between a bit sequence and a symbol sequence based on a trellis diagram. The trellis diagram can be used in the DM, to reduce complexity of the DM. For example, refer to FIG. 5. The trellis diagram may be constructed or defined, and the trellis diagram may be optimized. A transmitter side may implement the DM, that is, a shaping processing function, by reading the trellis diagram. A receiver side may implement an inverse-DM (inv-DM), that is, a de-shaping processing function, by reading the trellis diagram.

The following further describes in detail the information processing method provided in an embodiment of the disclosure.

Figure 6:
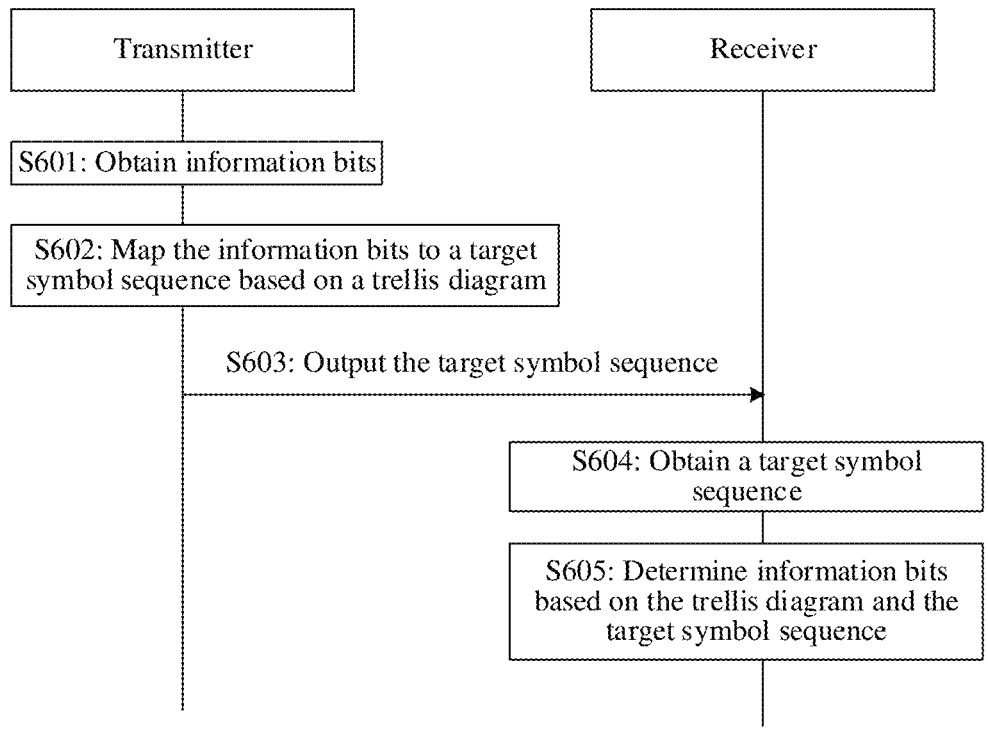
FIG. 6 is a schematic flowchart of an information processing method according to an example embodiment of the disclosure.

FIG. 6 shows an information processing method. The method mainly includes the following procedure.

S601: A transmitter obtains information bits, where the information bits include K bits, and K is a positive integer.

The information bits may also be understood as bits on which shaping needs to be performed. For example, in a polar shaping and encoding operation, the information bits may be information bits in one group of information bit sequences obtained through the foregoing information bit grouping. A value of K may be determined by a quantity of bits on which shaping needs to be performed, or may be determined by a length of a sequence in which target symbols are set to be shaped.

S602: The transmitter maps the information bits to a target symbol sequence based on a trellis diagram.

The target symbol sequence includes M symbols, M is a positive integer greater than K, and the M symbols include m symbols whose values are first values. The first value is any one of p values, and the p values may be understood as a value range of a symbol in the target symbol sequence, in other words, a value of the symbol in the target symbol sequence is one of the p values, where p is a positive integer greater than 1. Optionally, the symbol in the target symbol sequence may include a bit or may be a symbol of another type. When the symbol is specifically a bit, a value of p is 2, in other words, a value of the corresponding bit is 0 or 1. When a symbol is not a bit but the symbol of another type, a value of p may be 2 or a positive integer greater than 2. For details, refer to a value of a symbol in actual application. This is not limited in the embodiment of the disclosure.

For example, p is 2, the values of the m symbols in the M symbols included in the target symbol sequence are the first values, and values of M-m symbols are all third values. Optionally, when a corresponding mapping requirement is that an evenly distributed symbol sequence is mapped to a symbol sequence that complies with specific distribution, the target symbol sequence needs to satisfy a $p_{bias}$ requirement, where m represents $[M(1-p_{bias})]$. In other words, the target symbol sequence needs to have $[M(1-p_{bias})]$ symbols whose values are first values, and the target symbol sequence needs to have $M-[M(1-p_{bias})]$ symbols whose values are third values. $\lfloor \ \rfloor$ represents a rounding down operator, and a value of $p_{bias}$ may be a decimal between 0 and 1, for example, the value of $p_{bias}$ is 0.3. In addition, it may be understood that, when all symbols in the target symbol sequence are bits, the target symbol sequence may also be referred to as a target bit sequence. In this case, when a value of a bit in the target bit sequence is the first value or the third value, the first value is 0, and the third value is 1; or the first value is 1, and the third value is 0.

Specifically, the trellis diagram may be understood as a directed graph, the trellis diagram may include at least M directed edges, and one directed edge corresponds to a value of one symbol. The directed edge may be understood as follows: Two endpoints of one directed edge include a start node and an end node, and the start node points to the end node. An element node in the trellis diagram points to another element node adjacent to the element node, to form one directed edge. Based on this, the transmitter may sequentially determine M+1 element nodes in the trellis diagram based on the information bits. A directed edge between two adjacent element nodes in the M+1 element nodes is used to determine the value of the symbol in the target symbol sequence. For example, a $j^{th}$ element node in the M+1 element nodes points to a $(j+1)^{th}$ element node, and a directed edge between the $j^{th}$ element node and the $(j+1)^{th}$ element node is used to determine a value of a $j^{th}$ symbol in the target symbol sequence. A value of j is taken from 1 to M, and j is a positive integer. Alternatively, it may be understood that the transmitter may determine, in the trellis diagram based on the information bits, a path including M directed edges.

A $1^{st}$ element node in the M+1 element nodes is related to values of parameters M and m of the target symbol sequence. In other words, the transmitter may determine the $1^{st}$ element node in the M+1 element nodes in the trellis diagram based on the values of M and m. A solution in which the transmitter determines the $1^{st}$ element node in the M+1 element nodes is described in detail below.

Further, a first element node is denoted as any one of first M element nodes in the M+1 element nodes. In the M+1 element nodes, a next node of the first element node is a second element node to which the first element node points. It may be understood that, in the trellis diagram, the first element node may point to one or more element nodes. The second element node is one of the one or more element nodes to which the first element node points. In addition, values of symbols corresponding to directed edges between the first element node and the different element nodes to which the first element node points are different. For example, if the element nodes to which the first element node points include the second element node and a fourth element node, a directed edge between the first element node and the second element node is denoted as a first directed edge, and a directed edge between the first element node and the fourth element node is denoted as a second directed edge. A value of a symbol corresponding to the first directed edge is different from a value of a symbol corresponding to the second directed edge.

A last element node in the M+1 element nodes may be understood as a leaf node. From a perspective of the start node and the end node that are of a directed edge, the leaf node is not used as the start node of the directed edge, but is used only as the end node of the directed edge.

The following further describes in detail a related definition of the trellis diagram and a manner in which the transmitter determines the M+1 element nodes.

First, the trellis diagram may be understood with reference to the following definitions (1) to (4).

(1) The trellis diagram includes a plurality of element nodes (at least M+1 element nodes).

A third element node is denoted as any element node in the trellis diagram, and the third element node may indicate a combinatorial number $C_I^i$, where $0 \le i \le I$, $0 \le I \le N$, $N \ge M$, and i, I, and N are all integers. N represents a maximum quantity of symbols in the target symbol sequence generated based on the trellis diagram. In other words, based on the trellis diagram, a longest target symbol sequence that may be mapped includes N symbols, or a symbol sequence with less than N symbols may be mapped. Alternatively, it may be understood that the trellis diagram supports a variable code length and code rate, which is flexible, and this is applicable to different wireless communication requirements. I may represent some or all of the N symbols, which are denoted as I symbols. i may represent a quantity of symbols that are in the I symbols and whose values are first values. Based on this, the $1^{st}$ element node in the M+1 element nodes may be understood as a third element node that indicates the combinatorial number $C_I^i$ when I is M and i is m. When I is M and i is m, the combinatorial number $C_I^i$ may be represented as $C_I^i$. In addition, it may be understood that a maximum value of i is greater than or equal to m.

For a trellis diagram, maximum values of parameters N and i that correspond to the trellis diagram may be predefined, and may be determined by the transmitter and/or a receiver. Optionally, when a value of I is N, the maximum value of i may be designed based on an actual requirement. In other words, a maximum quantity of symbols whose values are first values and that are in the longest target symbol sequence that can be mapped based on the trellis diagram may be designed based on an actual requirement. This is not limited in the embodiment of the disclosure.

(2) Element nodes in the trellis diagram are connected.

The third element node is denoted as any element node in the trellis diagram. The third element node and an element node adjacent to the third element node may form a directed edge, and one directed edge corresponds to a value of one symbol. Specifically, with reference to that the third element node indicates the combinatorial number $C_I^i$, when I is greater than 0, the third element node may be specifically any element node in the trellis diagram except an element node that indicates $C_0^0$, and the third element node may point to one or more element nodes in the trellis diagram. When I is equal to 0, the third element node indicates $C_0^0$, and in this case, the third element node is the leaf node. The third element node may be connected to an element node that indicates $C_1^0$ and/or an element node that indicates $C_1^1$.

The first element node is used as an example. Corresponding to that i represents the quantity of symbols that are in the I symbols and whose values are the first values, when the value of the symbol corresponding to the directed edge between the first element node and the second element node is not the first value, the first element node indicates the combinatorial number $C_I^i$, and a combinatorial number indicated by the second element node may be represented as $C_{I-1}^i$. In other words, it indicates that when the first element node points to the second element node, the quantity of symbols whose values are the first values does not change. For another example, when the value of the symbol corresponding to the directed edge between the first element node and the second element node is the first value, the first element node indicates the combinatorial number $C_I^i$, a combinatorial number indicated by the second element node may be represented as $C_{I-1}^{i-1}$, and the third element node indicates the combinatorial number $C_{I-1}^{i-1}$. In other words, it indicates that when the first element node points to the second element node, the quantity of symbols whose values are the first values is reduced by one.

(3) In the trellis diagram, each element node has a value. If the third element node points to a plurality of element nodes, a value of the third element node is less than or equal to a sum of values of the plurality of element nodes to which the third element node points.

For example, in the M+1 element nodes in the trellis diagram, when the first element node points to a plurality of element nodes, a value of the first element node is less than or equal to a sum of values of the plurality of element nodes to which the first element node points. Specifically, for example, when the first element node points to the second element node and the fourth element node, the value of the first element node is less than or equal to a sum of values of the second element node and the fourth element node.

(4) Different element nodes in the trellis diagram indicate different combinatorial numbers, and the value of each element node is less than or equal to a combinatorial number indicated by the element node. For example, the third element node represents any element node in the trellis diagram. The value of the third element node may be less than or equal to the combinatorial number $C_I^i$ indicated by the third element node. Specifically, the value of the third element node may be obtained with reference to the following design 1 or design 2.

Design 1: The value of the third element node may be equal to the combinatorial number $C_I^i$ indicated by the third element node, and the value of the third element node may be represented as a decimal number or a binary number, or may be $C_I^i$ indicated by the third element node.

Figure 7A:
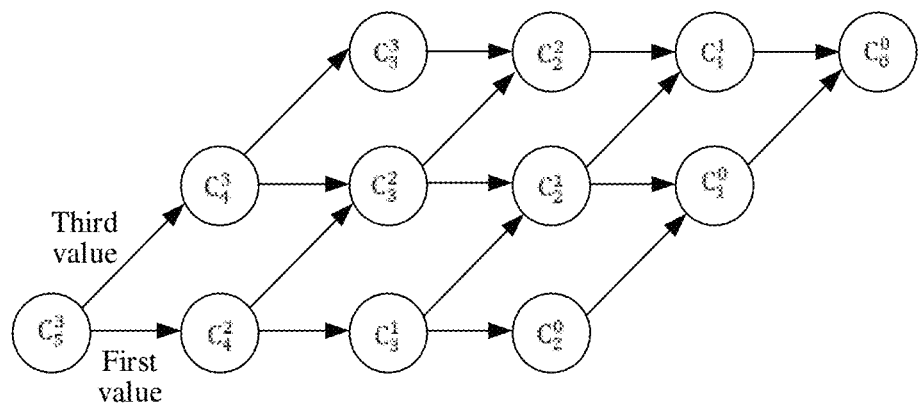
FIG. 7A is one of schematic diagrams of structures of a trellis diagram according to an example embodiment of the disclosure.

An example in which a value of a symbol corresponding to a directed edge in the trellis diagram is the first value or the third value is used. FIG. 7A shows a trellis diagram. A longest target symbol sequence that may be mapped based on the trellis diagram includes 5 (N) symbols. A maximum quantity of symbols whose values are first values in the longest target symbol sequence is 3. In $C_I^i$ indicated by any element node in the trellis diagram, that is, the third element node, a value range of i is 0≤i≤3, i≤I, and a value range of I is 0≤I≤5. A value of each element node in the trellis diagram is represented as $C_I^i$ indicated by the element node. For example, an element node in a lower-left corner of the trellis diagram is $C_5^3$. Starting from the element node in the lower-left corner, when I is greater than 0, a right side neighboring node connected to the third element node (which indicates $C_I^i$) indicates $C_{I-1}^{i-1}$ and/or an upper-right side neighboring node connected to the third element node indicates $C_{I-1}^i$. For example, a right side neighboring node of the element node in the lower-left corner is $C_4^2$, and an upper-right side neighboring node of the element node in the lower-left corner is $C_4^2$. Alternatively, when I is equal to 0, a combinatorial number indicated by the third element node is $C_0^0$.

Figure 7B:
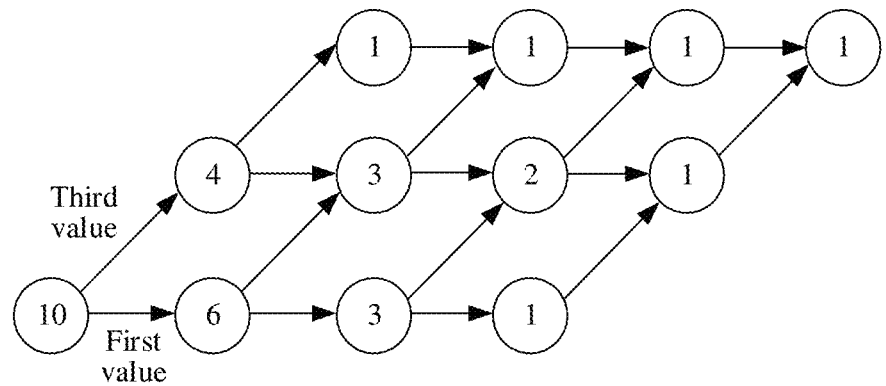
FIG. 7B is one of schematic diagrams of structures of a trellis diagram according to an example embodiment of the disclosure.

An example in which a value of a symbol corresponding to a directed edge in the trellis diagram is the first value or the third value is used. FIG. 7B shows a trellis diagram. A longest target symbol sequence that may be mapped based on the trellis diagram includes 5 (N) symbols. A maximum quantity of symbols whose values are first values in the longest target symbol sequence is 3. In $C_I^i$ indicated by any element node in the trellis diagram, that is, the third element node, a value range of i is 0≤i≤3, i≤I, and a value range of I is 0≤I≤5. A value of each element node in the trellis diagram is represented as a decimal number. For example, an element node in a lower-left corner of the trellis diagram indicates $C_5^3$, and a value of the element node in the lower-left corner in the trellis diagram may be 10. Starting from the element node in the lower-left corner, when I is greater than 0, a right side neighboring node connected to the third element node (which indicates $C_I^i$) indicates $C_{I-1}^{i-1}$ and/or an upper-right side neighboring node connected to the third element node indicates $C_{I-1}^i$. For example, a right side neighboring node of the element node in the lower-left corner indicates $C_4^2$, whose value is 6, and an upper-right side neighboring node of the element node in the lower-left corner indicates $C_4^3$, whose value is 4. Alternatively, when I is equal to 0, a combinatorial number indicated by the third element node is $C_0^0$, whose value is 1.

Design 2: A target effective number of bits may be set, and an effective number of bits in a binary number corresponding to the value of the third element node is less than or equal to the target effective number of bits. Specifically, if an effective number of bits in a binary number corresponding to the combinatorial number $C_I^i$ indicated by the third element node is greater than the target effective number of bits, the value of the third element node is less than the combinatorial number $C_I^i$, and the effective number of bits in the binary number corresponding to the value of the third element node is the target effective number of bits. Optionally, a specific value of the third element node is a maximum value that satisfies the target effective number of bits and that is less than the combinatorial number $C_I^i$. If the effective number of bits in the binary number corresponding to the combinatorial number $C_I^i$ indicated by the third element node is less than or equal to the target effective number of bits, the value of the third element node is equal to the combinatorial number $C_I^i$.

Figure 7C:
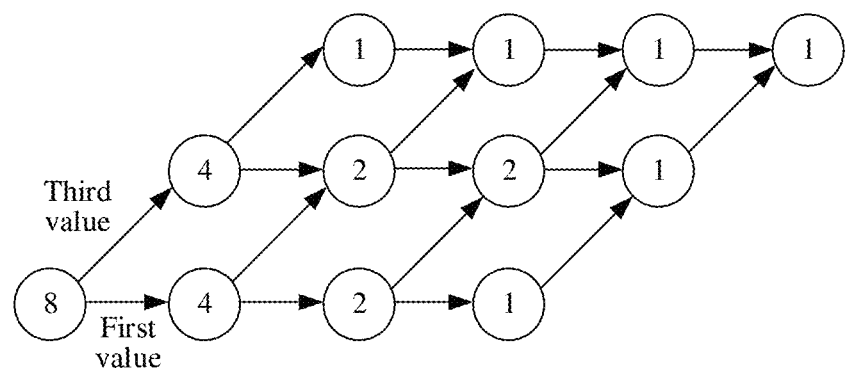
FIG. 7C is one of schematic diagrams of structures of a trellis diagram according to an example embodiment of the disclosure.

An example in which a value of a symbol corresponding to a directed edge in the trellis diagram is the first value or the third value is used. FIG. 7C shows a trellis diagram. A longest target symbol sequence that may be mapped based on the trellis diagram includes 5 (N) symbols, the first value is 0, and the third value is 1. A maximum quantity of symbols whose values are first values in the longest target symbol sequence is 3. In $C_I^i$ indicated by any element node in the trellis diagram, a value range of i is 0≤i≤3, i≤I, and a value range of I is 0≤I≤5. A value of each element node in the trellis diagram is represented as a decimal number, and a target effective number of bits is 1. An element node in a lower-left corner of the trellis diagram indicates $C_5^3$. A value of the element node in the lower-left corner may be less than $C_5^3$, whose maximum value of a matched target effective number of bits is 8, which corresponds to a binary number 1000. Starting from the element node in the lower-left corner, when I is greater than 0, a right side neighboring node connected to the third element node (which indicates $C_I^i$) indicates $C_{I-1}^{i-1}$ and/or an upper-right side neighboring node connected to the third element node indicates $C_{I-1}^{i-1}$. For example, a right side neighboring node of the element node in the lower-left corner indicates $C_4^2$, and a value of the right side neighboring node may be less than $C_4^2$, whose maximum value of a matched target effective number of bits is 4, which corresponds to a binary number 100. An upper-right side neighboring node of the element node in the lower-left corner indicates $C_4^3$, a binary number corresponding to $C_4^3$ satisfies a target effective number of bits, whose value is 4, which corresponds to the binary number 100. When I is equal to 0, a combinatorial number indicated by the third element node is $C_0^0$, whose value is 1.

In the foregoing design 2, the target effective number of bits is introduced, to reduce an effective number of bits of each element node in the trellis diagram. This can reduce storage resources occupied by the trellis diagram. It is specified that each element node in the trellis diagram is as close as possible to 2 to the power of an integer, to help a DM map evenly distributed binary bits to a target symbol sequence that complies with specific distribution. Optionally, the design 2 may also be understood as a design of optimizing the trellis diagram based on the design 1, and may be denoted as trellis optimization.

(5) Further optionally, symmetry of combinatorial numbers, for example, $C_3^2=C_3^1$, $C_2^2=C_2^0$, or $C_1^1=C_1^0$, is considered. On a basis of the foregoing trellis diagrams described in (1) to (4), some unnecessary element nodes in the foregoing trellis diagrams may be removed based on the symmetry of the combinatorial numbers, to implement trellis diagram optimization, that is, compression of the trellis diagram. For example, it is specified that for any element node in the trellis diagram, that is, the third element node, in the combinatorial number $C_I^i$ indicated by the third element node, if the value of I is an even number, the value range of i may be $$0 \le i \le \frac{I}{2} \text{ or } \frac{I}{2} \le i \le I.$$

For example, when I is 4, element nodes that indicate $C_4^0$, $C_4^1$, and $C_4^2$ may be included in the trellis diagram, or element nodes that indicate $C_4^2$, $C_4^3$, and $C_4^4$ may be included in the trellis diagram. But there is no case in which both the element node that indicates $C_4^0$, and the element node that indicates $C_4^4$ are included, and no case in which both the element node that indicates $C_4^1$, and the element node that indicates $C_4^3$ are included. If the value of I is an odd number, the value range of i may be $$0 \le i \le \frac{I-1}{2} \text{ or } \frac{I-1}{2} < i \le I.$$

To be specific, when I is 3, element nodes that indicate $C_3^0$ and $C_3^1$ may be included in the trellis diagram, or element nodes that indicate $C_3^2$ and $C_3^3$ may be included in the trellis diagram. But there is no case in which both the element node that indicates $C_3^1$ and the element node that indicates $C_3^2$ are included. In this way, storage of the trellis diagram can be compressed, to implement effective and proper use of the storage resources.

Figure 8A:
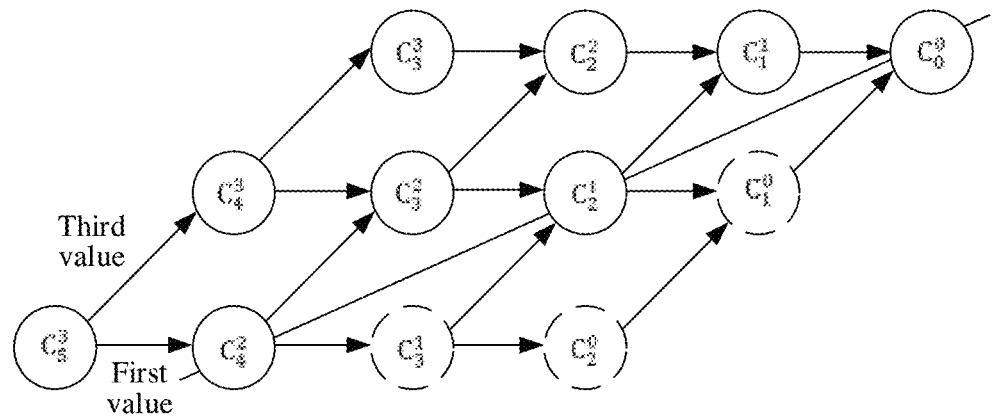
FIG. 8A is one of schematic diagrams of structures of a trellis diagram according to an example embodiment of the disclosure.
Figure 8B:
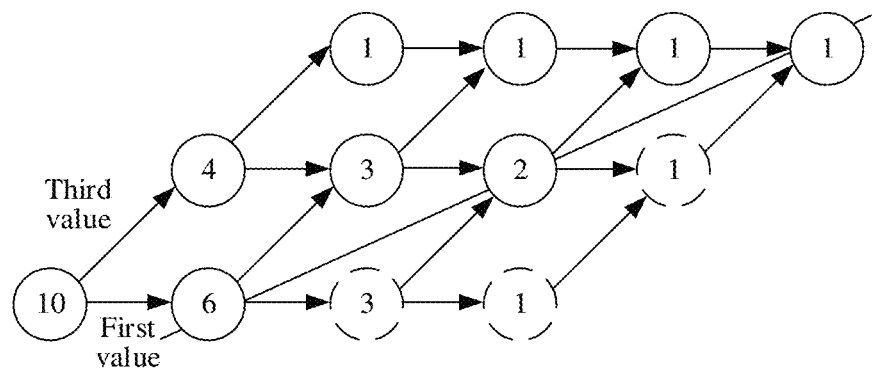
FIG. 8B is one of schematic diagrams of structures of a trellis diagram according to an example embodiment of the disclosure.
Figure 8C:
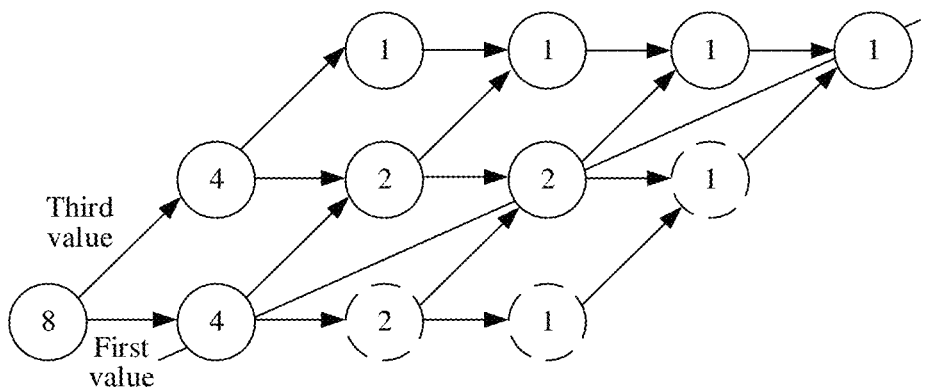
FIG. 8C is one of schematic diagrams of structures of a trellis diagram according to an example embodiment of the disclosure.

For example, FIG. 8A shows a compressed trellis diagram. On the basis of FIG. 7A, dashed circles are used to show unnecessary element nodes, such as $C_3^1$, $C_3^0$, and $C_1^0$, that may be removed from the trellis diagram in FIG. 7A based on the symmetry of the combinatorial numbers. FIG. 8B shows a compressed trellis diagram. On the basis of FIG. 7B, dashed circles are used to show unnecessary element nodes, such as an element node that indicates $C_3^1$, an element node that indicates $C_2^0$, and an element node that indicates $C_1^0$, that may be removed from the trellis diagram in FIG. 7B based on the symmetry of the combinatorial numbers. FIG. 8C shows a compressed trellis diagram. On the basis of FIG. 7C, dashed circles are used to show unnecessary element nodes, such as an element node that indicates $C_3^1$, an element node that indicates $C_2^0$, and an element node that indicates $C_1^0$, that may be removed from the trellis diagram in FIG. 7C based on the symmetry of the combinatorial numbers.

With reference to at least one of the foregoing definitions (1) to (5) of the trellis diagram, a manner in which the transmitter determines the M+1 element nodes in the trellis diagram may be implemented according to the following steps A1 and A2.

A1: The transmitter determines, in the trellis diagram based on the parameters M and m of the given target symbol sequence, a fifth element node that may indicate $C_M^m$, where the fifth element node represents the $1^{st}$ element node in the foregoing M+1 element nodes.

Figure 9:
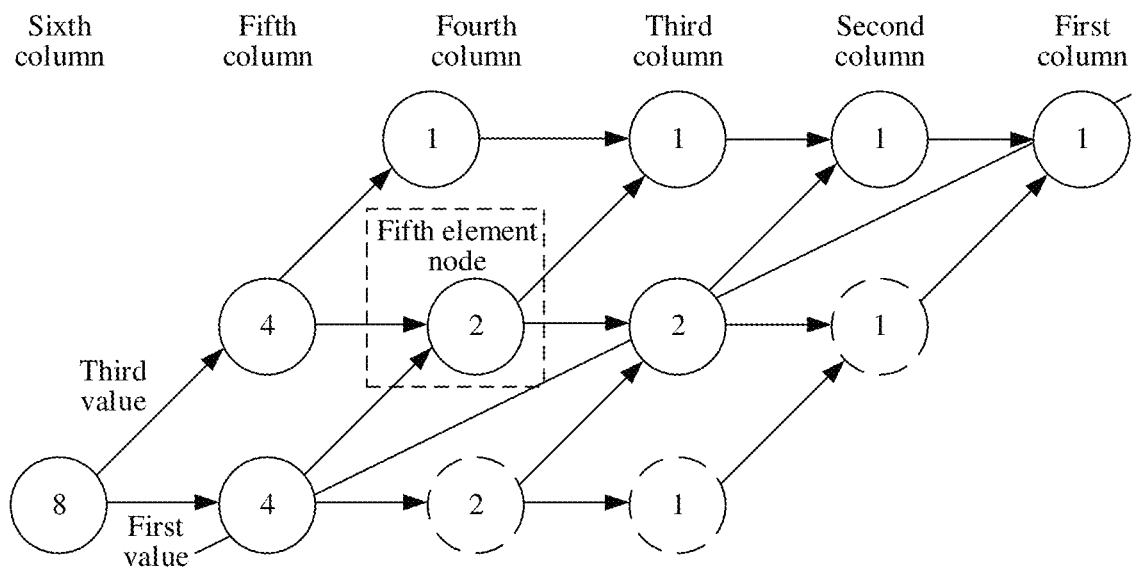
FIG. 9 is a schematic diagram of disclosure of a trellis diagram according to an example embodiment of the disclosure.

Based on a structure of the foregoing trellis diagram, the transmitter may specifically determine an $(M-m+1)^{th}$ element node from top to bottom in an $(M+1)^{th}$ column from right to left in the trellis diagram as the fifth element node, that is, the $1^{st}$ element node in the M+1 element nodes. For example, for the trellis diagram shown in FIG. 8C, it is assumed that M is specified to 3, m is specified to 2, and a quantity K of information bits that can be carried is 1 (that is, one bit on which shaping needs to be performed). The transmitter reads a fourth column from the trellis diagram in FIG. 8C from right to left, and then reads a $2^{nd}$ element node in the fourth column from top to bottom. The read element node is the fifth element node. Further, refer to FIG. 9, column numbers are marked from right to left on the basis of FIG. 8C. A location of the fifth element node (marked by using a rectangular dashed box) when M is 3 and m is 2 is marked.

A2: The transmitter sequentially traverses remaining M element nodes starting from the fifth element node.

For example, the value of the symbol in the target symbol sequence is the first value or the third value, the first element node is any one of the first M element nodes in the M+1 element nodes, and the first element node points to at most two element nodes. A2 may be specifically implemented with reference to the following manner.

(1) A next element node of the fifth element node, that is, a $2^{nd}$ element node in the M+1 element nodes, may be determined according to the following A21 or A22.

A21: If values corresponding to the information bits described in S601 are less than a value of a right side neighboring node of the fifth element node, traverse the fifth element node to the right side neighboring node.

Specifically, the information bits in S601 are denoted as $v_1$, $v_2$, and $v_3$, . . . , $v_{K_{shaping}}$. $K_{shaping}$ corresponds to the foregoing K, which indicates that the information bits include K bits. F represents a value of a right side neighboring node of an element node. As described in the foregoing design 1 or design 2, F may be represented as a decimal number or a binary number. The following uses an example in which F is represented as a decimal number. A manner of this step may be further described as follows.

If $bi2de(v_1, v_2, \text{ and } v_3, \ldots, v_{K_{shaping}}) < F$, the fifth element node is translated rightwards to the right side neighboring node for further execution. bi2de indicates that binary data is converted into a decimal number. It may be understood that if F is a binary number, bi2de conversion does not need to be performed.

A22: If values corresponding to the information bits described in S601 are greater than or equal to a value of a right side neighboring node of the fifth element node, traverse the fifth element node to an upper-right side neighboring node.

Specifically, the information bits in S601 are denoted as $v_1$, $v_2$, and $v_3$, . . . , $v_{K_{shaping}}$. $K_{shaping}$ corresponds to the foregoing K, which indicates that the information bits include K bits. F represents a value of a right side neighboring node of an element node. As described in the foregoing design 1 or design 2, F may be represented as a decimal number or a binary number. The following uses an example in which F is represented as a decimal number. A manner of this step may be further described as follows.

If $bi2de(v_1, v_2, \text{ and } v_3, \ldots, v_{K_{shaping}}) \ge F$, the fifth element node is traversed along an oblique upward arrow to the upper-right side neighboring node of the fifth element node for further execution, and the information bits $v_1$, $v_2$, and $v_3$, . . . , $v_{K_{shaping}}$ are updated in the following manner: $v_1$, $v_2$, and $v_3$, . . . , $v_{K_{shaping}} = de2bi(bi2de(v_1, v_2, \text{ and } v_3, \ldots, v_{K_{shaping}}) - F)$. Updated $v_1$, $v_2$, and $v_3$, . . . , $v_{K_{shaping}}$ are on the left of the equation. "$v_1$, $v_2$, and $v_3$, . . . , $v_{K_{shaping}}$" on the right of the equation are the information bits in S601. bi2de indicates that binary data is converted into a decimal number, and de2bi indicates that decimal data is converted into a binary number. It may be understood that if F is a binary number, bi2de and de2bi conversion do not need to be performed.

(2) The $2^{nd}$ element node to an $(M+1)^{th}$ element node in the M+1 element nodes may be repeatedly determined according to the following A23 or A24.

A23: If a value corresponding to an information bit obtained through previous traversal is less than a value of a right side neighboring node of a current element node, traverse the current element node to the right side neighboring node.

An example in which F is represented as a decimal number is used with reference to descriptions of A21. A manner of this step may be further described as follows.

If $bi2de(v_1, v_2, \text{ and } v_3, \ldots, v_{K_{shaping}}) < F$, the current element node is translated rightwards to the right side neighboring node for further execution. bi2de indicates that binary data is converted into a decimal number. $v_1$, $v_2$, and $v_3$, . . . , $v_{K_{shaping}}$ are the information bits obtained through the previous traversal. For example, when the current element node is the $2^{nd}$ element node, $v_1$, $v_2$, and $v_3$, . . . , $v_{K_{shaping}}$ may be information bits obtained through A22 or A23. If A22 is performed, $v_1, v_2$, and $v_3, \ldots, v_{K_{shaping}}$ still correspond to the information bits described in S601. If A23 is performed, $v_1, v_2$, and $v_3, \ldots, v_{K_{shaping}}$ correspond to the updated information bits described in A22. In addition, it may be understood that if F is a binary number, bi2de conversion does not need to be performed.

A24: If a value corresponding to an information bit obtained through previous traversal is greater than or equal to a value of a right side neighboring node of a current element node, traverse the current element node to an upper-right side neighboring node.

An example in which F is represented as a decimal number is used with reference to descriptions of A22. A manner of this step may be further described as follows.

If $bi2de(v_1, v_2, \text{and } v_3, \ldots, v_{K_{shaping}}) \geq F$, the current element node is traversed along an oblique upward arrow to the upper-right side neighboring node of the current element node for further execution, and the information bits $v_1, v_2$, and $v_3, \ldots, v_{K_{shaping}}$ are updated in the following manner: $v_1, v_2, \text{and } v_3, \ldots, v_{K_{shaping}} = \text{de2bi}(\text{bi2de}(v_1, v_2, \text{and } v_3, \ldots, v_{K_{shaping}}) - F)$. Updated $v_1, v_2$, and $v_3, \ldots v_{K_{shaping}}$ of this time are on the left of the equation. "$v_1, v_2, \text{and } v_3, \ldots, v_{K_{shaping}}$" on the right of the equation are the information bits obtained through the previous traversal. For example, when the current element node is the $2^{nd}$ element node, $v_1, v_2$, and $v_3, \ldots, v_{K_{shaping}}$ on the right of the equation may be the information bits obtained through A21 or A22. If A21 is performed, $v_1, v_2$, and $v_3, \ldots, v_{K_{shaping}}$ on the right of the equation still correspond to the information bits described in S601. If A22 is performed, $v_1, v_2$, and $v_3, \ldots, v_{K_{shaping}}$ on the right of the equation correspond to the updated information bits described in A22. In addition, bi2de indicates that binary data is converted into a decimal number, and de2bi indicates that decimal data is converted into a binary number. It may be understood that if F is a binary number, bi2de and de2bi conversion do not need to be performed.

The M+1 element nodes may be determined according to A1 and A2, and the transmitter may determine the value of the $j^{th}$ symbol in the target symbol sequence based on the directed edge between the $j^{th}$ element node and the $(j+1)^{th}$ element node in the M+1 element nodes. A value of j is taken from 1 to M, and j is a positive integer.

In S602, by reading the trellis diagram, the evenly distributed bit sequence (that is, the foregoing information bits) may be mapped to the target symbol sequence that complies with the specific distribution, and no complex and frequent division operations are used. The trellis diagram may be deployed in a DM for polar encoding, to implement shaping processing, or referred to as a shaping capability of the DM, to reduce complexity of the DM.

S603: The transmitter outputs the target symbol sequence.

Specifically, the transmitter may output the target symbol sequence to a channel.

Figure 3B:
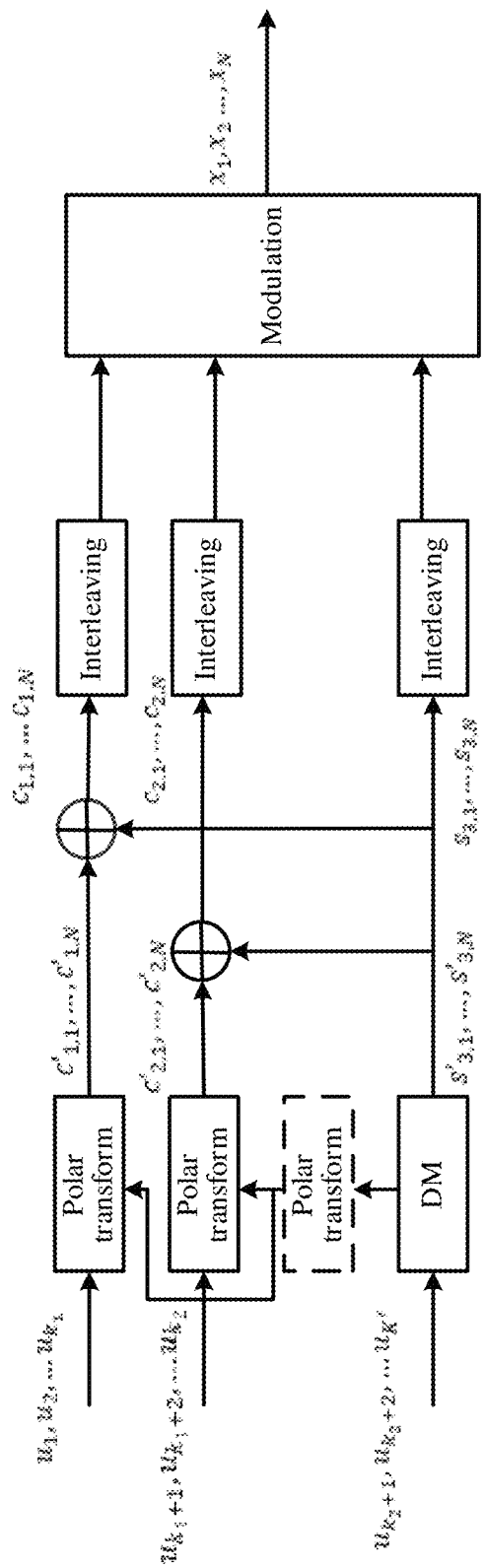
FIG. 3B is one of schematic flowcharts of example polar shaping and encoding.

Optionally, when channel encoding is used for transmission, for example, when polar encoding is used for transmission, the transmitter may obtain an encoded sequence based on the foregoing descriptions of FIG. 3A/FIG. 3B through polar channel encoding and cascading into a long code. In addition, the transmitter may further modulate the encoded sequence based on modulation described in FIG. 3A/FIG. 3B, and then output a modulated and encoded sequence to the channel.

S604: The receiver obtains a target symbol sequence, where the target symbol sequence includes M symbols, M is a positive integer, and the M symbols include m symbols whose values are first values.

The target symbol sequence obtained by the receiver may be understood as being similar to the target symbol sequence output by the transmitter in S603.

Specifically, the receiver may obtain the modulated and encoded sequence on the channel, and obtains the target symbol sequence through demodulation and decoding. The receiver may decode the encoded and modulated sequence in a manner related to channel decoding, to obtain a target bit sequence. It may be understood that channel decoding corresponds to channel encoding at the transmitter. For example, the transmitter uses the polar encoding manner, and the receiver correspondingly uses a decoding manner of polar encoding to perform channel decoding. This is not limited in the embodiment of the disclosure.

Optionally, after determining the target symbol sequence, the receiver determines whether the target symbol sequence satisfies the $p_{bias}$ requirement. For example, a value of a symbol in the target symbol sequence is the first value or the third value. It is determined whether a quantity m of symbols whose values are first values in the target symbol sequence is $[M(1-p_{bias})]$, and/or it is determined whether a quantity M-m of symbols whose values are third values in the target symbol sequence is $[M(1-p_{bias})]$. If a determining result shows that the $p_{bias}$ requirement is satisfied, S605 is performed; or if a determining result shows that the requirement is not satisfied, information used to indicate that de-shaping fails is output.

S605: The receiver determines information bits based on the trellis diagram and the target symbol sequence, where the information bits include K bits, K is a positive integer, and M is greater than K.

For the definition of the trellis diagram, refer to the foregoing descriptions of S601 and S602 for understanding.

Specifically, with reference to the trellis diagram described in S601 and S602, the manner in which the receiver determines the information bits may be understood based on the following content.

A first bit sequence is updated based on a value of at least one of the M+1 element nodes in the trellis diagram, to obtain the information bits, where the first bit sequence includes K bits, and a value of each bit in the first bit sequence is a second value, and the second value may be specifically 0, where the value of the symbol in the target symbol sequence corresponds to the directed edge between two adjacent element nodes in the M+1 element nodes, the $1^{st}$ element node in the M+1 element nodes is related to the value of M and the value of m, the first element node is any one of the first M element nodes in the M+1 element nodes, and the next node of the first element node in the M+1 element nodes is the second element node.

Specifically, this manner may be implemented according to the following steps B1 and B2.

B1: Initialize and define the first bit sequence, where the first bit sequence includes K bits, and the value of each bit in the first bit sequence is the second value.

For example, the first bit sequence may be represented as $\tilde{v}_1, \tilde{v}_2, \ldots,$ and $\tilde{v}_{K_{shaping}}$, where the second value is 0, $\tilde{v}_1=0$, $\tilde{v}_2=0, \ldots,$ and $\tilde{v}_{K_{shaping}}=0$.

B2: Corresponding to S602, the $1^{st}$ element node in the M+1 element nodes is denoted as the fifth element node. The transmitter sequentially traverses, starting from the fifth element node in the trellis diagram, the remaining M element nodes based on values of M bits in the target sequence.

For example, the value of the symbol in the target symbol sequence is the first value or the third value, the first element node is any one of the first M element nodes in the M+1 element nodes, and the first element node points to at most two element nodes. B2 may be specifically implemented with reference to the following manner.

(1) The next element node of the fifth element node, that is, the $2^{nd}$ element node in the M+1 element nodes, may be determined according to the following B21 or B22.

B21: If a value of a $1^{st}$ symbol in the target symbol sequence is the first value, traverse the fifth element node to the right side neighboring node.

Specifically, the target symbol sequence is denoted as $\tilde{s}_1, \tilde{s}_2, \ldots,$ and $\tilde{s}_M$. F represents a value of a right side neighboring node of an element node. As described in the foregoing design 1 or design 2, F may be represented as a decimal number or a binary number. The following uses an example in which F is represented as a decimal number. A manner of this step may be further described as follows.

If a value of si is the first value, the first bit sequence is not updated, and the fifth element node is translated rightwards to the right side neighboring node for further execution.

B22: If a value of a $1^{st}$ symbol in the target symbol sequence is the third value, update the first bit sequence based on a value of the right side node of the fifth element node, and traverse the fifth element node to the right side neighboring node for further execution.

Specifically, the target bit sequence is denoted as $\tilde{s}_1, \tilde{s}_2, \ldots,$ and $\tilde{s}_M$. F represents a value of a right side neighboring node of an element node. As described in the foregoing design 1 or design 2, F may be represented as a decimal number or a binary number. The following uses an example in which F is represented as a decimal number. A manner of this step may be further described as follows.

If a value of si is the third value, the fifth element node is traversed along an oblique upward arrow to the upper-right side neighboring node of the fifth element node for further execution. The first bit sequence $\tilde{v}_1, \tilde{v}_2, \ldots,$ and $\tilde{v}_{K_{shaping}}$ is updated in the following manner: $\tilde{v}_1, \tilde{v}_2, \ldots,$ and $\tilde{v}_{K_{shaping}} = \text{de2bi}(\text{bi2de}(\tilde{v}_1, \tilde{v}_2, \ldots,$ and $\tilde{v}_{K_{shaping}}) + F)$. Updated $\tilde{v}_1, \tilde{v}_2, \ldots,$ and $\tilde{v}_{K_{shaping}}$ are on the left of the equation. "$\tilde{v}_1, \tilde{v}_2, \ldots,$ and $\tilde{v}_{K_{shaping}}$" on the right of the equation is the first bit sequence in B21. bi2de indicates that binary data is converted into a decimal number, and de2bi indicates that decimal data is converted into a binary number. It may be understood that if F is a binary number, bi2de and de2bi conversion do not need to be performed.

(2) The $2^{nd}$ element node to the $(M+1)^{th}$ element node in the M+1 element nodes may be traversed according to the following B23 or B24.

B23: If a value of an $x^{th}$ symbol in the target symbol sequence is the first value, traverse an $x^{th}$ element node in the M+1 element nodes to a right side neighboring node, where x is taken from integers from 2 to M.

An example in which F is represented as a decimal number is used with reference to descriptions of B21. A manner of this step may be further described as follows.

If a value of $\tilde{s}_x$ is the first value, the first bit sequence is not updated, and the $x^{th}$ element node is translated rightwards to the right side neighboring node for further execution.

B24: If a value of an $x^{th}$ symbol in the target symbol sequence is the third value, update the first bit sequence based on a value of a right side node of an $x^{th}$ element node in the M+1 element nodes, and traverse the $x^{th}$ element node to the right side neighboring node for further execution.

An example in which F is represented as a decimal number is used with reference to descriptions of B22. A manner of this step may be further described as follows.

If a value of $\tilde{s}_x$ is the third value, the $x^{th}$ element node is traversed along an oblique upward arrow to an upper-right side neighboring node of the $x^{th}$ element node for further execution, and a first bit sequence $\tilde{v}_1, \tilde{v}_2, \ldots,$ and $\tilde{v}_{K_{shaping}}$ that is obtained through previous (that is, an $(x-1)^{th}$) traversal is updated in the following manner: $\tilde{v}_1, \tilde{v}_2, \ldots,$ and $\tilde{v}_{K_{shaping}} = \text{de2bi}(\text{bi2de}(\tilde{v}_1, \tilde{v}_2, \ldots,$ and $\tilde{v}_{K_{shaping}}) + F)$. Updated $\tilde{v}_1, \tilde{v}_2, \ldots,$ and $\tilde{v}_{K_{shaping}}$ of this time are on the left of the equation. "$\tilde{v}_1, \tilde{v}_2, \ldots,$ and $\tilde{v}_{K_{shaping}}$" on the right of the equation is the first bit sequence obtained through previous traversal. For example, when a current element node is the $2^{nd}$ element node, in other words, x is 2, $\tilde{v}_1, \tilde{v}_2, \ldots,$ and $\tilde{v}_{K_{shaping}}$ on the right of the equation may be the first bit sequence obtained through B21 or B22. If B21 is performed, $\tilde{v}_1, \tilde{v}_2, \ldots,$ and $\tilde{v}_{K_{shaping}}$ on the right of the equation still corresponds to the first bit sequence initialized and defined in B1. If B23 is performed, $\tilde{v}_1, \tilde{v}_2, \ldots,$ and $\tilde{v}_{K_{shaping}}$ correspond to the updated information bits described in B22. bi2de indicates that binary data is converted into a decimal number, and de2bi indicates that decimal data is converted into a binary number. It may be understood that if F is a binary number, bi2de and de2bi conversion do not need to be performed.

x is taken from integers from 2 to M, and B22/B23 is repeatedly performed until a last element node in the M+1 element nodes is traversed. Finally, an updated first bit sequence may be determined as the foregoing information bits.

In S605, by reading the trellis diagram, evenly distributed binary bits can be recovered from the target symbol sequence that complies with the specific distribution, and no complex and frequent division operations are used. The trellis diagram is used by the receiver to provide de-shaping, or referred to as a de-shaping capability, to reduce decoding complexity and reduce a decoding delay. For example, the trellis diagram may be deployed in an inverse-DM (inv-DM) at the receiver, to implement de-shaping processing, or referred to as a de-shaping capability of the inv-DM, to reduce complexity of the inv-DM.

The foregoing describes the method provided in an embodiment of the disclosure from perspectives of the transmitter, the receiver, and interaction between the transmitter and the receiver. To implement functions in the foregoing method, the transmitter and the receiver may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on specific application and implementation constraints of the technical solutions.

Figure 10:
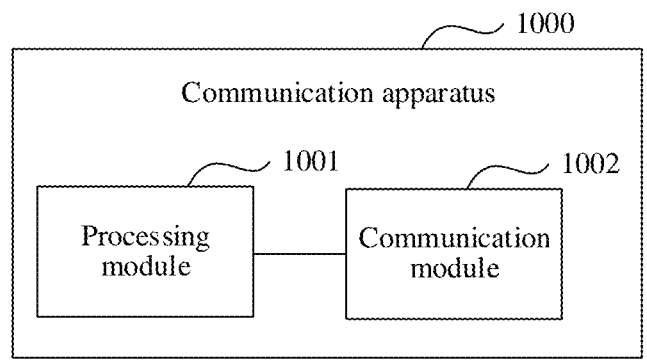
FIG. 10 is one of schematic diagrams of structures of a communication apparatus according to an example embodiment of the disclosure.

Based on the same concept, refer to FIG. 10. An embodiment of the disclosure provides a communication apparatus 1000. The communication apparatus 1000 includes a processing module 1001 and a communication module 1002. The communication apparatus 1000 may be a transmitter, or may be a communication apparatus that is used in a transmitter or that is used in a matching manner with a transmitter, and that can implement a method performed by the transmitter side. Alternatively, the communication apparatus 1000 may be a receiver, or may be a communication apparatus that is used in a receiver or that is used in a matching manner with a receiver, and that can implement a method performed by the receiver side.

The communication module may also be referred to as a transceiver module, a transceiver, a transceiver machine, a transceiver apparatus, or the like. The processing module may also be referred to as a processor, a processing board, a processing unit, a processing apparatus, or the like. Optionally, a component that is in the communication module and that is configured to implement a receiving function may be considered as a receiving unit. It should be understood that the communication module is configured to perform a transmitting operation and a receiving operation on an access network device side or a terminal device side in the foregoing method embodiment, and a component that is in the communication module and that is configured to implement a transmitting function is considered as a transmitting unit. In other words, the communication module includes a receiving unit and a transmitting unit.

When the communication apparatus 1000 is used in the transmitter, the processing module 1001 may be configured to implement a processing function of the transmitter in the embodiment shown in FIG. 6, and the communication module 1002 may be configured to implement all or some of receiving and transmitting functions of the transmitter in the embodiment shown in FIG. 6. Alternatively, the communication apparatus may be understood with reference to the third aspect and the possible implementations in the third aspect in SUMMARY.

When the communication apparatus 1000 is used in the receiver, the processing module 1001 may be configured to implement a processing function of the receiver in the embodiment shown in FIG. 6, and the communication module 1002 may be configured to implement all or some receiving and transmitting functions of the receiver in the embodiment shown in FIG. 6. Alternatively, the communication apparatus may be understood with reference to the third aspect and the possible implementations in the third aspect in SUMMARY.

In addition, it should be noted that the communication module and/or the processing module may be implemented by using a virtual module. For example, the processing module may be implemented by using a software functional unit or a virtual apparatus, and the communication module may be implemented by using a software function or a virtual apparatus. Alternatively, the processing module or the communication module may be implemented by using a physical apparatus. For example, if the apparatus is implemented by using a chip/chip circuit, the communication module may be an input/output circuit and/or a communication interface, and performs an input operation (corresponding to the receiving operation) and an output operation (corresponding to the transmitting operation). The processing module is an integrated processor, a microprocessor, or an integrated circuit.

Division into the modules in the embodiment of the disclosure is an example, is merely division into logical functions, and may be other division during actual implementation. In addition, functional modules in the embodiment of the disclosure may be integrated into one processor, or each of the modules may exist alone physically, or two or more modules may be integrated into one module. The integrated module may be implemented in a form of hardware, or may be implemented in a form of a software functional module.

Based on a same technical concept, an embodiment of the disclosure further provides a communication apparatus 1100. The communication apparatus 1100 may be a chip or a chip system. Optionally, in the embodiment of the disclosure, the chip system may include a chip, or may include a chip and another discrete component.

The communication apparatus 1100 may be configured to implement a function of any network element in the communication system shown in FIG. 1. The communication apparatus 1100 may include at least one processor 1110. The processor 1110 is coupled to a memory 1120. Optionally, the memory 1120 may be located in the apparatus, the memory 1120 may be integrated with the processor, or the memory 1120 may be located outside the apparatus. For example, the communication apparatus 1100 may further include at least one memory 1120. The memory 1120 stores a computer program, configuration information, instructions, and/or data that are necessary for implementing any one of the foregoing embodiments. The processor 1110 may execute the computer program stored in the memory 1120, to complete the method in any one of the foregoing embodiments.

The communication apparatus 1100 may further include a communication interface 1130, and the communication apparatus 1100 may exchange information with another device through the communication interface 1130. For example, the communication interface 1130 may be a transceiver, a circuit, a bus, a module, a pin, or a communication interface of another type. When the communication apparatus 1100 is a chip apparatus or circuit, the communication interface 1130 in the apparatus 1100 may alternatively be an input/output circuit, and may input information (or referred to as receiving information) and output information (or referred to as transmitting information). The processor is an integrated processor, a microprocessor, an integrated circuit, or a logic circuit. The processor may determine output information based on the input information.

A coupling in the embodiment of the disclosure may be an indirect coupling or a communication connection between apparatuses, units, or modules in an electrical form, a mechanical form, or another form, and is used for information exchange between the apparatuses, the units, or the modules. The processor 1110 may cooperate with the memory 1120, and the communication interface 1130. A specific connection medium among the processor 1110, the memory 1120, and the communication interface 1130 is not limited in the embodiment of the disclosure.

Figure 11:
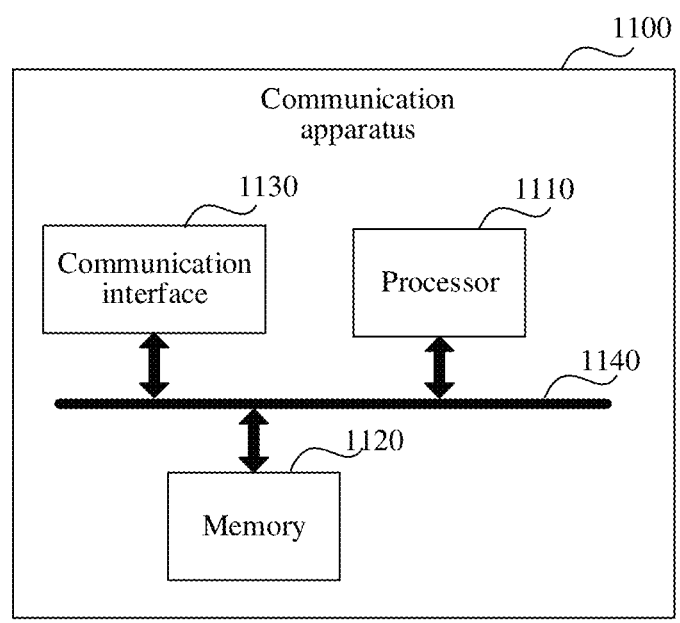
FIG. 11 is one of schematic diagrams of structures of a communication apparatus according to an example embodiment of the disclosure.

Optionally, refer to FIG. 11. The processor 1110, the memory 1120, and the communication interface 1130 are connected to each other through a bus 1140. The bus 1140 may be a peripheral component interconnect (PCI) bus, an extended industry standard architecture (EISA) bus, or the like. The bus may be classified into an address bus, a data bus, a control bus, and the like. For ease of representation, only one bold line represents the bus in FIG. 11, but this does not mean that there is only one bus or only one type of bus.

In embodiments of the disclosure, the processor may be a general-purpose processor, a digital signal processor, an application-specific integrated circuit, a field programmable gate array or another programmable logic device, a discrete gate or a transistor logic device, or a discrete hardware component, and may implement or execute the method, steps, and logical block diagrams in embodiments of the disclosure. The general purpose processor may be a microprocessor or any conventional processor or the like. The steps of the method in embodiments of the disclosure may be directly performed by a hardware processor, or may be performed by using a combination of hardware in the processor and a software module.

In embodiments of the disclosure, the memory may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in embodiments of the disclosure may alternatively be a circuit or any other apparatus that can implement a storage function, and is configured to store program instructions and/or data.

In a possible implementation, the communication apparatus 1100 may be used in a transmitter. Specifically, the communication apparatus 1100 may be the transmitter, or may be an apparatus that can support the transmitter and implement a function of the transmitter in any one of the foregoing embodiments. The memory 1120 stores a computer program, instructions, and/or data that are necessary for implementing a function of the transmitter in any one of the foregoing embodiments. The processor 1110 may execute the computer program stored in the memory 1120, to complete the method performed by the transmitter in any one of the foregoing embodiments. When the communication apparatus 1100 is used in the transmitter, the communication interface in the communication apparatus 1100 may be configured to interact with a receiver, for example, transmit information to the receiver.

In another possible implementation, the communication apparatus 1100 may be used in the receiver. Specifically, the communication apparatus 1100 may be the receiver, or may be an apparatus that can support the receiver and implement a function of the receiver in any one of the foregoing embodiments. The memory 1120 stores a computer program, instructions, and/or data that are necessary for implementing a function of the receiver in any one of the foregoing embodiments. The processor 1110 may execute the computer program stored in the memory 1120, to complete the method performed by the receiver in any one of the foregoing embodiments. When the communication apparatus 1100 is used in the receiver, the communication interface in the communication apparatus 1100 may be configured to interact with the transmitter, for example, receive information from the transmitter.

The communication apparatus 1100 provided in the embodiment may be used in the transmitter to complete the foregoing method performed by the transmitter, or may be used in the receiver to complete the method performed by the receiver. Therefore, for technical effects that can be achieved by the embodiment, refer to the foregoing method embodiment.

Based on the foregoing embodiments, an embodiment of the disclosure further provides a computer program. When the computer program is run on a computer, the computer is enabled to perform, from a perspective of a transmitter side or a receiver side, the method provided in the embodiment shown in FIG. 6.

Based on the foregoing embodiments, an embodiment of the disclosure further provides a computer-readable storage medium. The computer-readable storage medium stores a computer program. When the computer program is executed by a computer, the computer is enabled to perform, from a perspective of a transmitter side or a receiver side, the method provided in the embodiment shown in FIG. 6. The storage medium may be any usable medium that can be accessed by the computer. The following are examples of the storage medium, but the storage medium is not limited thereto. The computer-readable medium may include a RAM, a read-only memory (ROM), an electrically erasable programmable read-only memory (EEPROM), a CD-ROM or another optical disc storage, a magnetic disk storage medium or another magnetic storage device, or any other medium that can carry or store expected program code in a form of an instruction or a data structure and that can be accessed by the computer.

Based on the foregoing embodiments, an embodiment of the disclosure provides a communication system, including a transmitter and a receiver. The transmitter and the receiver may implement the method provided in the embodiment shown in FIG. 6.

Based on the foregoing embodiments, an embodiment of the disclosure further provides a chip. The chip is configured to: read a computer program stored in a memory, and implement, from a perspective of a transmitter side or a receiver side, the method provided in the embodiment shown in FIG. 6.

Based on the foregoing embodiments, an embodiment of the disclosure further provides a chip system. The chip system includes a processor, configured to support a computer apparatus in implementing functions related to the transmitter or the receiver in the embodiment shown in FIG. 6. In a possible implementation, the chip system further includes a memory, and the memory is configured to store a program and data that are necessary for the computer apparatus. The chip system may include a chip, or may include a chip and another discrete component.

All or some of the technical solutions provided in embodiments of the disclosure may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, all or some of the procedures or the functions in embodiments of the disclosure are generated. The computer may be a general-purpose computer, a special-purpose computer, a computer network, an access network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of the disclosure, when there is no logical conflict, embodiments may be mutually referenced. For example, methods and/or terms in the method embodiments may be mutually referenced, functions and/or terms in apparatus embodiments may be mutually referenced, and functions and/or terms in the apparatus embodiments and the method embodiments may be mutually referenced.

It is clear that a person skilled in the art may make various modifications and variations to embodiments of the disclosure without departing from the scope of embodiments of the disclosure. In this way, embodiments of the disclosure are also intended to cover these modifications and variations provided that they fall within the scope of the claims of embodiments of the disclosure and equivalent technologies thereof.

What is claimed is:

1. An information processing method implemented via a first communication device having processing circuitry including at least one processor, the method comprising:
   obtaining, via the first communication device, information bits having K bits, wherein K is a positive integer; and
   mapping, via the first communication device, the information bits to a target symbol sequence based on a trellis diagram, wherein
   the target symbol sequence includes M symbols,
   M is a positive integer greater than K,
   the M symbols include m symbols whose values are first values,
   the trellis diagram includes at least M directed edges, and
   a directed edge, from the M directed edges, corresponds to a value of a first symbol in the target symbol sequence, wherein
   the method further comprises:
   sequentially determining, via the first communication device, M+1 element nodes in the trellis diagram based on the information bits, wherein the directed edge between two adjacent element nodes, in the M+1 element nodes, is used to determine the value of the first symbol in the target symbol sequence, wherein
   a first element node, in the M+1 element nodes, is related to a value of M and a value of m,
   the first element node is any one of first M element modes in the M+1 element nodes,
   a next mode of the first element mode is a second element node in the M+1 element nodes,
   the first element node points to one or more element nodes in the trellis diagram, and
   the second element mode is one of the one or more element nodes; and
   outputting, via the first communication device, the target symbol sequence to a communication channel.

2. The method according to claim 1, wherein the first element node points to a plurality of element nodes, of the one or more element nodes, and values of symbols corresponding to directed edges between the first element node and the plurality of element nodes, to which the first element node points, are different.

3. The method according to claim 2, wherein
   each element node, from the M+1 element nodes, in the trellis diagram has a value,
   the first element node points to the plurality of element nodes, and
   a value of the first element node is less than or equal to a sum of values of the plurality of element nodes to which the first element node points.

4. The method according to claim 1, wherein
   a third element node is any one of the M+1 element nodes,
   the third element node indicates a combinatorial number $C\_I^i$, a value of the third element node is less than or equal to the combinatorial number $C\_I^i$, $0 \leq i \leq I$, $0 \leq I \leq N$, $N \geq M$, and i, I, and N are all integers, and
   different element nodes in the trellis diagram indicate different combinatorial numbers.

5. The method according to claim 4, wherein
   an effective number of bits in a binary number corresponding to the combinatorial number $C\_I^i$ is greater than a target effective number of bits,
   the value of the third element node is less than the combinatorial number $C\_I^i$, and
   the effective number of bits in the binary number corresponding to the value of the third element node is the target effective number of bits.

6. The method according to claim 4, wherein
   an effective number of bits in a binary number corresponding to the combinatorial number $C\_I^i$ is less than or equal to a target effective number of bits, and
   the value of the third element node is equal to the combinatorial number $C\_I^i$.

7. The method according to claim 4, wherein
   a value of I is an even number, and $$0 \leq i \leq \frac{I}{2} \text{ or } \frac{I}{2} \leq i \leq I,$$

a value of I is an odd number, and $$0 \leq i \leq \frac{I-1}{2} \text{ or } \frac{I-1}{2} < i \leq I.$$

8. A communication apparatus, comprising:
   a processor; and
   a memory configured to store computer readable instructions that, when executed by the processor, cause the communication apparatus to:
   obtain information bits having K bits, and wherein K is a positive integer; and
   map the information bits to a target symbol sequence based on a trellis diagram, wherein
   the target symbol sequence includes M symbols,
   M is a positive integer greater than K,
   the M symbols include m symbols whose values are first values,
   the trellis diagram includes at least M directed edges, and
   a directed edge, from the M directed edges, corresponds to a value of a first symbol in the target symbol sequence, wherein
   the communication is further caused to:
   sequentially determine M+1 element modes in the trellis diagram based on the information bits, wherein the directed edge between two adjacent element nodes, in the M+1 element nodes, is used to determine the value of the first symbol in the target symbol sequence, wherein
   a first element node, in the M+1 element nodes, is related to a value of M and a value of m,
   the first element node is any one of first M element nodes in the M+1 element nodes,
   a next mode of the first element mode is a second element mode in the M+1 element nodes,
   the first element node points to one or more element nodes in the trellis diagram, and
   the second element mode is one of the one or more element modes; and
   output the target symbol sequence to a communication channel.

9. The communication apparatus according to claim 8, wherein the first element node points to a plurality of element nodes, of the one or more element nodes, and values of symbols corresponding to directed edges between the first element node and the plurality of element nodes, to which the first element node points, are different.

10. The communication apparatus according to claim 9, wherein
each element node, from the M+1 element nodes, in the trellis diagram has a value,
the first element node points to the plurality of element nodes, and
a value of the first element node is less than or equal to a sum of values of the plurality of element nodes to which the first element node points.

11. The communication apparatus according to claim 8, wherein
a third element node is any one of the M+1 element nodes,
the third element node indicates a combinatorial number $C\_I^{\wedge}i$, a value of the third element node is less than or equal to the combinatorial number $C\_I^{\wedge}i$, $0 \le i \le I$, $0 \le I \le N$, $N \ge M$, and i, I, and N are all integers, and
different element nodes in the trellis diagram indicate different combinatorial numbers.

12. The communication apparatus according to claim 11, wherein
an effective number of bits in a binary number corresponding to the combinatorial number $C\_I^{\wedge}i$ is greater than a target effective number of bits,
the value of the third element node is less than the combinatorial number $C\_I^{\wedge}i$, and
the effective number of bits in the binary number corresponding to the value of the third element node is the target effective number of bits.

13. The communication apparatus according to claim 11, wherein
an effective number of bits in a binary number corresponding to the combinatorial number $C\_I^{\wedge}i$ is less than or equal to a target effective number of bits, and
the value of the third element node is equal to the combinatorial number $C\_I^{\wedge}i$.

14. The communication apparatus according to claim 11, wherein
a value of I is an even number, and $$0 \le i \le \frac{I}{2} \text{ or } \frac{I}{2} \le i \le I,$$

a value of I is an odd number, and $$0 \le i \le \frac{I-1}{2}$$

or $$\frac{I-1}{2} < i \le I.$$

15. A non-transitory computer-readable storage medium having computer readable instructions that, when executed by a computer of a communication apparatus, cause the communication apparatus to provide execution comprising:
obtaining information bits having K bits, and wherein K is a positive integer; and
mapping the information bits to a target symbol sequence based on a trellis diagram, wherein
the target symbol sequence includes M symbols,
M is a positive integer greater than K,
the M symbols include m symbols whose values are first values,
the trellis diagram includes at least M directed edges, and
a directed edge, from the M directed edges, corresponds to a value of a first symbol in the target symbol sequence, wherein
the communication apparatus is further caused to provide execution that comprises:
sequentially determining M+1 element nodes in the trellis diagram based on the information bits, wherein the directed edge between two adjacent element nodes, in the M+1 element nodes, is used to determine the value of the first symbol in the target symbol sequence, wherein
a first element node, in the M+1 element nodes, is related to a value of M and a value of m,
the first element mode is any one of first M element nodes in the M+1 element nodes,
a next mode of the first element node is a second element mode in the MAIL element nodes,
the first element node points to one or more element nodes in the trellis diagram, and
the second element node is one of the one or more element nodes; and
outputting the target symbol sequence to a communication channel.

16. The non-transitory computer-readable storage medium according to claim 15, wherein the first element node points to a plurality of element nodes, of the one or more element nodes, and values of symbols corresponding to directed edges between the first element node and the plurality of element nodes, to which the first element node points, are different.

17. The non-transitory computer-readable storage medium according to claim 16, wherein
each element node, from the M+1 element nodes, in the trellis diagram has a value,
the first element node points to the plurality of element nodes, and
a value of the first element node is less than or equal to a sum of values of the plurality of element nodes to which the first element node points.

18. The non-transitory computer-readable storage medium according to claim 15, wherein
a third element node is any one of the M+1 element nodes,
the third element node indicates a combinatorial number $C\_I^{\wedge}i$, a value of the third element node is less than or equal to the combinatorial number $C\_I^{\wedge}i$, $0 \le i \le I$, $0 \le I \le N$, $N \ge M$, and i, I, and N are all integers, and
different element nodes in the trellis diagram indicate different combinatorial numbers.

19. The non-transitory computer-readable storage medium according to claim 18, wherein
an effective number of bits in a binary number corresponding to the combinatorial number $C\_I^{\wedge}i$ is greater than a target effective number of bits,
the value of the third element node is less than the combinatorial number $C\_I^{\wedge}i$, and
the effective number of bits in the binary number corresponding to the value of the third element node is the target effective number of bits.

20. The non-transitory computer-readable storage medium according to claim 18, wherein
- an effective number of bits in a binary number corresponding to the combinatorial number $C\_I\hat{}i$ is less than or equal to a target effective number of bits, and
- the value of the third element node is equal to the combinatorial number $C\_I\hat{}i$.

\* \* \* \* \*